(12) United States Patent
Albrecht et al.

(10) Patent No.: US 9,127,857 B2
(45) Date of Patent: Sep. 8, 2015

(54) HIGH EFFICIENCY SOLAR RECEIVER

(71) Applicant: Babcock & Wilcox Power Generation Group, Inc., Barberton, OH (US)

(72) Inventors: Melvin J Albrecht, Homeworth, OH (US); Kiplin C Alexander, Wadsworth, OH (US); Steven P Iannacchione, Canal Fulton, OH (US); Jason M Marshall, Wadsworth, OH (US); Justin A Persinger, Norton, OH (US); David T Wasyluk, Mogadore, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 376 days.

(21) Appl. No.: 13/678,320

(22) Filed: Nov. 15, 2012

(65) Prior Publication Data

US 2013/0118482 A1    May 16, 2013

Related U.S. Application Data

(60) Provisional application No. 61/560,631, filed on Nov. 16, 2011.

(51) Int. Cl.
| | |
|---|---|
| *F24J 2/07* | (2006.01) |
| *F24J 2/24* | (2006.01) |
| *F24J 2/52* | (2006.01) |
| *F24J 2/46* | (2006.01) |
| *F28F 9/013* | (2006.01) |

(52) U.S. Cl.
CPC ..... *F24J 2/07* (2013.01); *F24J 2/24* (2013.01); *F24J 2/4636* (2013.01); *F24J 2/5201* (2013.01); *F24J 2002/4656* (2013.01); *F28F 9/0132* (2013.01); *Y02E 10/41* (2013.01); *Y02E 10/44* (2013.01)

(58) Field of Classification Search
CPC .............. F24J 2/07; F22B 1/006; Y02E 10/41
USPC .................................................. 126/684, 688
See application file for complete search history.

(56) References Cited

U.S. PATENT DOCUMENTS

| | | | | |
|---|---|---|---|---|
| 4,245,618 | A * | 1/1981 | Wiener ......................... | 126/643 |
| 8,033,110 | B2 * | 10/2011 | Gilon et al. ................ | 60/641.11 |
| 8,490,618 | B2 * | 7/2013 | Kroizer et al. ................ | 126/600 |
| 2004/0108099 | A1 * | 6/2004 | Litwin ......................... | 165/48.2 |
| 2009/0241939 | A1 * | 10/2009 | Heap et al. ..................... | 126/645 |
| 2010/0101564 | A1 * | 4/2010 | Iannacchione et al. ........ | 126/680 |
| 2010/0252025 | A1 * | 10/2010 | Kroizer et al. ................ | 126/600 |
| 2013/0192586 | A1 * | 8/2013 | Wasyluk et al. .............. | 126/619 |

* cited by examiner

*Primary Examiner* — Jorge Pereiro
(74) *Attorney, Agent, or Firm* — Eric Marich

(57) ABSTRACT

A solar receiver includes a multi-sided central assembly with wing assemblies extending from corners thereof. The central assembly includes one-sided heat absorption panels, while the wing assemblies use two-sided heat absorption panels. Stiffener structures run across the exposed faces of the various heat absorption panels.

18 Claims, 18 Drawing Sheets

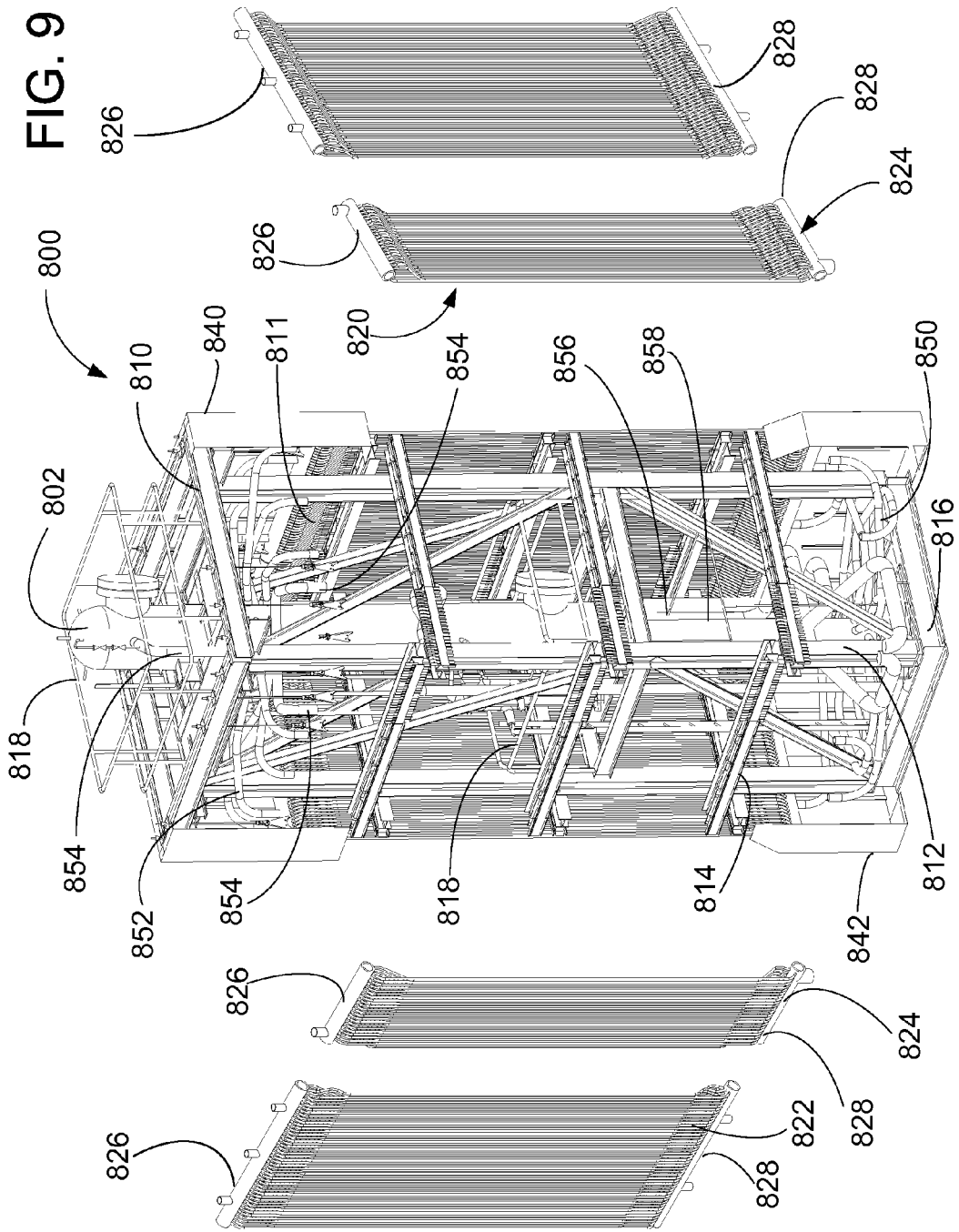

HIGH EFFICIENCY SOLAR RECEIVER

This application claims priority to U.S. Provisional Patent Application Ser. No. 61/560,631, filed on Nov. 16, 2011. The disclosure of this application is hereby fully incorporated herein by reference in its entirety.

BACKGROUND

The present disclosure relates broadly to the field of solar power generation used to produce electricity. More particularly, this disclosure relates to a dual-exposure or two-sided heat absorption panel, and a solar receiver including one or more of such panels. These solar receiver designs can be used with Concentrated Solar Tower technology, also known as Concentrating Solar Power (CSP) technology to harness the sun's energy to produce "green" electricity.

A solar receiver is a primary component of a solar energy generation system whereby sunlight is used as a heat source for the eventual production of superheated high quality steam that is used to turn a turbine generator, and ultimately produce electricity using the Rankine cycle or provide steam for other thermal processes.

Generally, the solar receiver is positioned on top of an elevated support tower which rises above a ground level or grade. The solar receiver is strategically positioned within an array of reflective surfaces, namely a field of heliostats (or mirrors), that collect rays of sunlight and then reflect and concentrate those rays back to the heat absorbing surfaces of the solar receiver. This solar energy is then absorbed by the working heat transfer fluid (HTF) flowing through the solar receiver. The reflective surfaces may be oriented in different positions throughout the day to track the sun and maximize reflected sunlight to the heat absorbing surfaces of the receiver.

The solar receiver is an assembly of tubes with water, steam, molten salts, or other heat transfer fluid (HTF) flowing inside the tubes. The HTF inside the tubes of the receiver absorbs the concentrated solar energy, causing the HTF to increase in temperature and/or change phases, so that the HTF captures the solar energy. The heated HTF is then either directly routed to a turbine generator to generate electrical power or is indirectly routed to a storage tank for later use.

Solar receiver designs typically include an arrangement of panels with vertically oriented tubes, i.e. tube panels, along with a support structure for maintaining the tube panels in place and other associated equipment (pumps, pipes, storage vessels, heat shields, etc.). In conventional designs, the solar receiver has a square, rectangular, or circular cross-section (in a plan view from above). The tube panels are arranged on the exterior of the cross-section, so that the solar energy from the heliostats is directed at (and absorbed by) only one face of a tube panel. This is illustrated in, for example, U.S. patent application Ser. No. 12/605,241, which is entitled "Shop-Assembled Solar Receiver Heat Exchanger" and is assigned to Babcock & Wilcox Power Generation Group, Inc., and which is hereby fully incorporated by reference herein.

In this regard, FIG. 1 is a plan view (i.e. viewed from above) of one solar receiver design 100 discussed above, which has four tube panels 110, 120, 130, 140, arranged as a square. Each tube panel has one exterior face 112, 122, 132, 142 which is exposed to solar energy from heliostats, and one interior face 114, 124, 134, 144 which is not exposed to such solar energy.

The interior non-absorbing face of a tube panel usually has a buckstay system that supports the tube panels against high wind, seismic forces, and thermally induced forces. The buckstay system typically includes "I" beams or other structural steel shapes that are clipped onto the tube panel in such a way that the tube panel can expand independent of the support structure itself and independent of the other tubes and panels. Clips are usually welded to the tubes so that the tube panel can move relative to the stationary support structure when heat is applied to the tubes, yet the support structure can still provide rigidity to the tube panel. On a solar receiver, the tubes in the tube panel are not welded together along their axes (i.e. membrane construction) as in a fossil fuel fired boiler, but are of loose construction. This allows the tubes to expand independently of each other when heat is applied. As a result, each tube must have a clip to attach to the buckstay at a support elevation.

It would be desirable to provide a compact solar receiver that uses a heat transfer fluid and which is simple in design, modular, and economical.

BRIEF DESCRIPTION

The present disclosure relates, in various embodiments, to solar receivers that include a central receiver assembly and at least one "wing" assembly. The wing assembly includes a dual-exposure or two-sided heat absorption panel, and is supported by structural components extending from the central receiver assembly. The heat absorption panels in the central receiver assembly and in the wing assembly may differ in the design and size of their tubing.

Disclosed herein in various embodiments is a solar receiver comprising a central receiver assembly and a wing assembly. The central receiver assembly comprises an internal support structure and at least one external central tube panel. The internal support structure defines an interior volume. The at least one external central tube panel comprises a plurality of vertical tubes for conveying a heat transfer fluid, wherein the tubes are interconnected by at least one upper header and at least one lower header. The external central tube panel is arranged on an exterior face of the internal support structure, with the external central tube panel having an exposed first face and a non-exposed second face. The wing assembly extends from the central receiver assembly, each wing assembly having a wing tube panel. The wing tube panel comprises a plurality of vertical tubes for conveying a heat transfer fluid, wherein the tubes are interconnected by at least one upper header and at least one lower header. Each wing tube panel has an exposed first face and an exposed second face opposite the first face.

The wing assembly may further comprise a structural support frame, the structural support frame including: a first vertical column; an upper horizontal beam extending between an upper end of the first vertical column and an upper connection on the internal support structure; and a lower horizontal beam extending from a lower end of the first vertical column to a lower connection on the internal support structure.

At least one panel support rod may extend between the structural support frame and the upper header of the wing tube panel.

The solar receiver may further comprise: a first stiffener structure running from the first side edge to the second side edge across the first face and the second face of the wing tube panel at a first support elevation. Sometimes, a second stiffener structure is also present running from the first side edge to the second side edge across the first face and the second face of the wing tube panel at a second support elevation.

In embodiments, each stiffener structure is formed from a first support assembly on the first face of the wing tube panel and a second support assembly on the second face of the wing tube panel. Each support assembly includes: a support tube; a horizontal flange extending from the support tube and having a slot therein; and a scallop bar engaging the tube panel and having at least one lug, the scallop bar engaging the horizontal flange by a pin passing through the at least one lug and the slot of the horizontal flange.

The support tube of each support assembly may have a different diameter from any tube in the wing tube panel, and in some embodiments is larger. An outer face of each support tube may be painted to decrease heat absorption.

In some embodiments, the first support assembly of the first stiffener structure is fluidly connected to the first support assembly of the second stiffener structure. The first support assembly of the first stiffener structure can be fluidly connected to the inlet header of the wing tube panel or fluidly connected to the at least one external central tube panel. In some other embodiments, the first support elevation and the second support elevation are not located at a middle section of the wing tube panel. Additional stiffener structures are contemplated depending on the height of the two-sided panel.

The central receiver assembly may further comprise an upper heat shield located above the external central tube panel and a lower heat shield located below the external central tube panel. The wing assembly may also further comprise a heat shield having an upper face located above the wing tube panel, a lower face located below the wing tube panel, and a side face located distal from the central receiver assembly. An open space can be present between the side face of the wing assembly heat shield and a side edge of the wing tube panel. Sometimes, the solar receiver further comprises a horizontal heat shield located above the external central tube panel.

The upper heat shield, lower heat shield, and wing assembly heat shield can be painted white to decrease heat absorption. Similarly, the first face and the second face of the wing tube panel can be painted black to increase heat absorption.

Each wing tube panel may include a plurality of tube passes, adjacent tube passes being arranged so that heat transfer fluid flows in a serpentine manner upward through one tube pass and down through another tube pass.

When the heat transfer fluid is water or steam, the solar receiver may further comprise a vertical water/steam separator to separate saturated water from dry saturated steam for further superheating of the dry steam. Alternatively, the solar receiver may further comprise a molten salt inlet vessel and a molten salt outlet vessel, when the heat transfer fluid is molten salt.

The external central tube panel may comprise wall tubes having helical internal ribs.

In particular embodiments, the internal support structure has a rectangular cross-section, the central receiver assembly has four central tube panels, and a total of four wing assemblies extend from corners of the central receiver assembly.

Also disclosed is a solar energy system, comprising: a solar receiver having a central receiver assembly and a wing assembly as described above; and a field of heliostats configured to direct sunlight towards the first face of the central tube panel, the first face of the wing tube panel, and the second face of the wing tube panel.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 9 is an exploded view of a central receiver assembly using a vertical water/steam separator.

DETAILED DESCRIPTION

Figure 1:
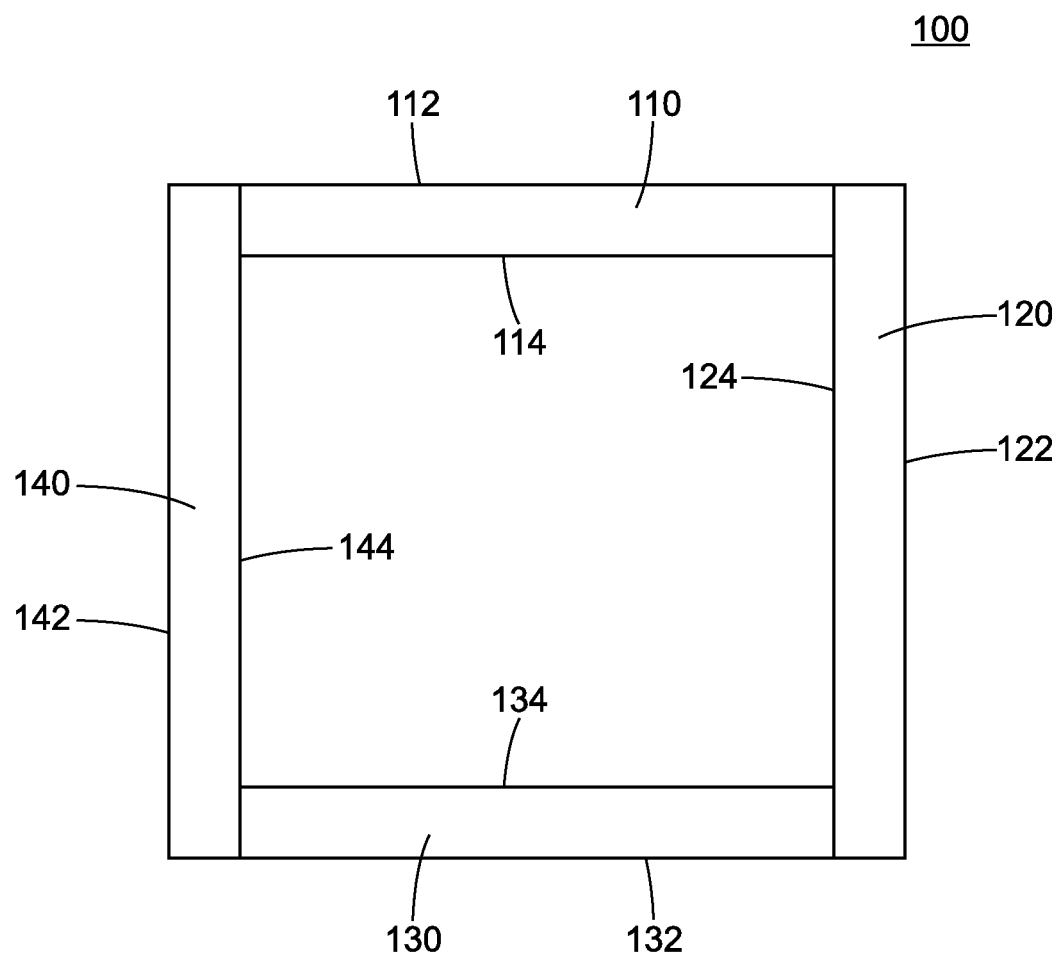
FIG. 1 is a plan (i.e. top) view of a central receiver assembly design having a square orientation, with each tube panel having one exterior exposed face and one interior non-exposed face.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

It should be noted that many of the terms used herein are relative terms. For example, the terms "interior", "exterior", "inward", and "outward" are relative to a center, and should not be construed as requiring a particular orientation or location of the structure. Similarly, the terms "upper" and "lower" are relative to each other in location, i.e. an upper component is located at a higher elevation than a lower component.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other.

The term "plane" is used herein to refer generally to a common level, and should be construed as referring to a volume, not as a flat surface.

To the extent that explanations of certain terminology or principles of the solar receiver, boiler and/or steam generator arts may be necessary to understand the present disclosure, the reader is referred to *Steam/its generation and use,* 40th Edition, Stultz and Kitto, Eds., Copyright 1992, The Babcock & Wilcox Company, and to *Steam/its generation and use,* 41st Edition, Kitto and Stultz, Eds., Copyright 2005, The Babcock & Wilcox Company, the texts of which are hereby incorporated by reference as though fully set forth herein.

The present disclosure relates to solar receivers that include a central receiver assembly and at least one "wing" assembly. The wing assembly includes a dual-exposure or two-sided heat absorption panel, and is supported by structural components extending from the central receiver assembly. The heat absorption panels in the central receiver assembly and in the wing assembly may differ in the design and size of their tubing.

The two-sided heat absorption panels in the wing assembly are designed to accept heat on two opposite sides or faces, rather than on only one side or face. This feature results in tube temperatures on the two opposite faces of the wing assembly that are more closely balanced than tube panels which are heated on only one side and therefore have an imbalanced tube temperature from the hot side (heat absorbing side) to the cold side (non-heat absorbing side) of the tubes. The temperature balance across the two opposite faces of the wing panel tubes reduces thermal stresses and thus can reduce tube failures due to fatigue and/or stress corrosion. In addition, the available heat absorbing area on the wing assembly is doubled compared to the heat absorbing area on the central receiver assembly, which can only absorb heat on one side. The combination of doubled heat absorbing area and reduced thermal stresses results in wing panels that can absorb more than twice as much heat as single-sided heating panels. This significantly improves collector surface efficiency. Desirably, it is contemplated that such technology can ultimately reduce the levelized cost of electricity (LCOE) by reducing pressure part quantity and/or receiver quantity, and by increasing plant efficiency by reducing solar receiver thermal losses and providing a more optimal target for heliostat pointing.

The panels may include one or more stiffener structures or heat shields. Generally, the solar receiver is located at the top of a vertical support structure which rises above a ground level or grade. The vertical support structure may be supported from a base. The heat transfer surfaces advantageously comprise loose tangent tube panels, which allows for unrestrained thermal expansion of the tubes/tube panels in both the horizontal and vertical directions, thereby eliminating additional tube stresses. As is known to those skilled in the art, the sizes of tubes, their material, diameter, wall thickness, number and arrangement for the heat transfer surfaces are based upon temperature and pressure for service, according to applicable design codes. Required heat transfer characteristics, circulation ratios, spot absorption rates, mass flow rates of the working fluid within the tubes, etc. are also important parameters which must be considered. Depending upon the geographic location where the solar receiver is to be installed, applicable seismic loads and design codes are also considered.

It should be noted that in some embodiments, molten salt is used as the heat transfer fluid (HTF) that is run through the absorption panel. In this regard, molten salt solidifies at approximately 430° F. (221° C., 494° K.). When the tube panel(s) of the solar receiver is not exposed to light/heat, either intentionally at shutdown or unexpectedly due to a heliostat field malfunction, the molten salt can quickly cool and form plugs. Plugged tubes can cause delays at start up and could lead to tube failures. Thus, the ability to drain molten salt quickly is typically part of the solar receiver design. The valves and additional piping for such draining may not be depicted herein, but should be considered as being present. The present disclosure also contemplates the use of water, steam, or any other heat transfer fluid, with appropriate modifications made to other components of the solar receiver.

Figure 2:
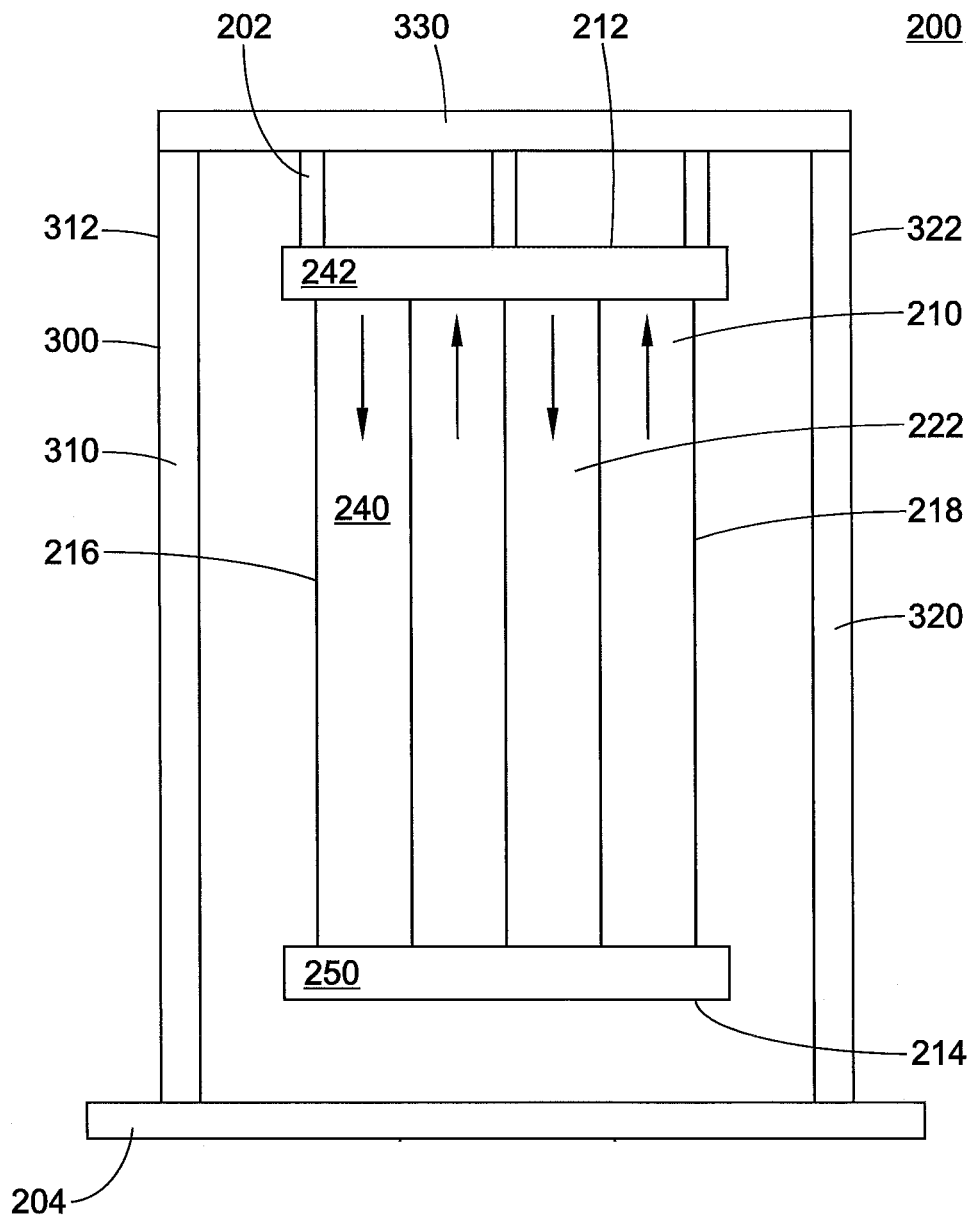
FIG. 2 is a first front view of a dual-exposure heat absorption panel that can be used in the wing assembly of the solar receiver of the present disclosure. In this figure, heat shields and panel stiffener support structures are removed to provide an interior view.
Figure 3:
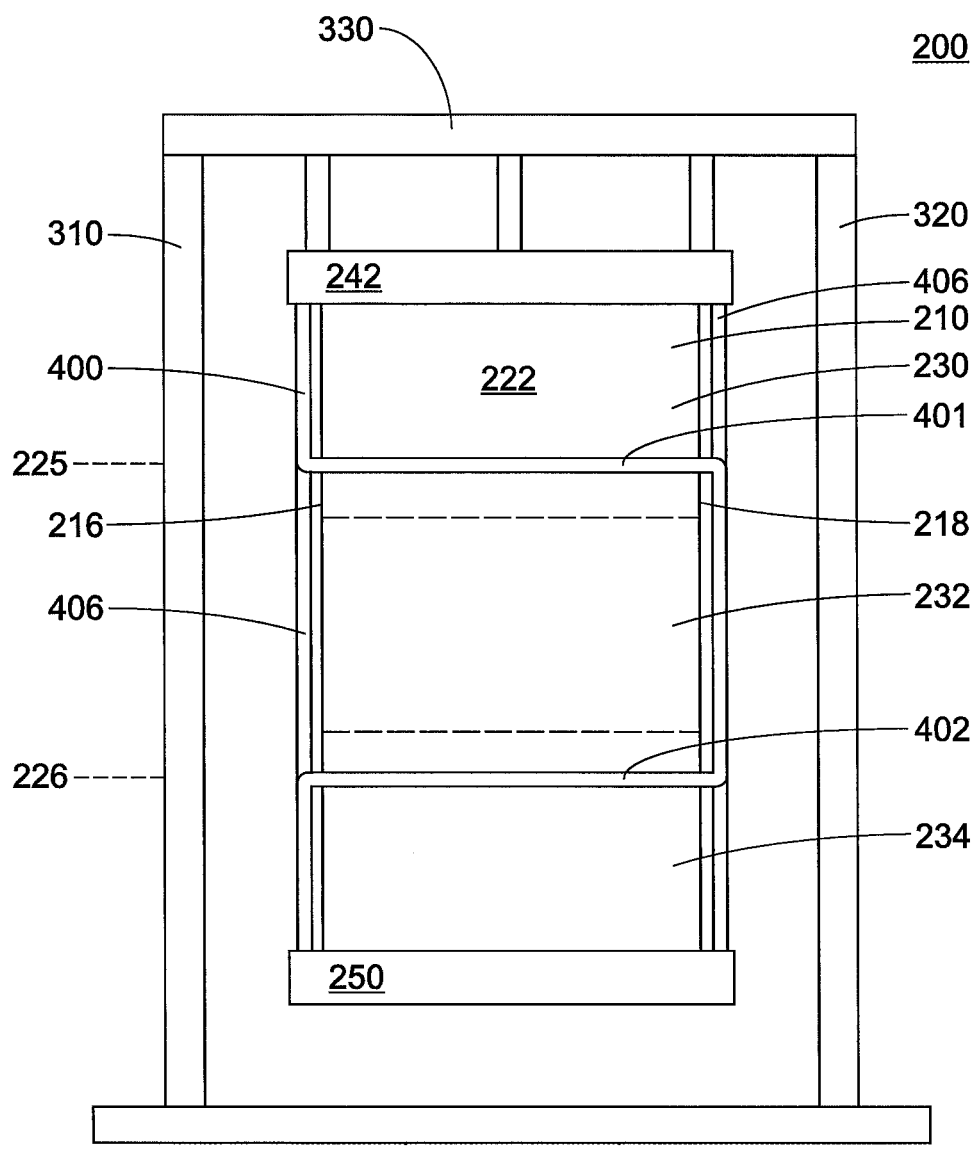
FIG. 3 is a second front view of the dual-exposure heat absorption panel of FIG. 2. In this figure, panel stiffener support structures are visible, and heat shields are removed to provide another interior view.
Figure 4:
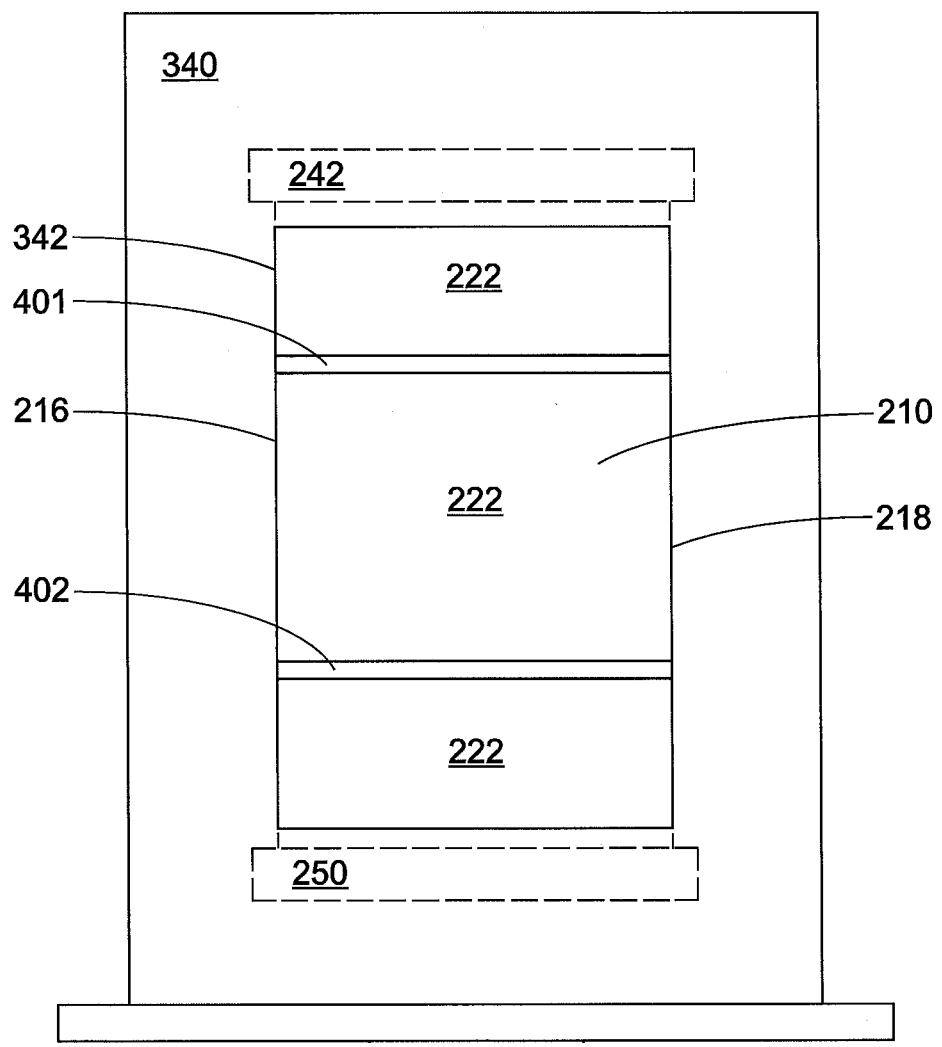
FIG. 4 is an exterior front view of the dual-exposure heat absorption panel of FIG. 2. Here, the heat shields are in place.

Initially, the components of the wing assembly and the central receiver assembly are described separately. FIGS. 2-4 are various front views of a wing assembly containing a dual-exposure or two-sided heat absorption panel, differing in the presence or absence of certain structures and allowing for a better comprehension of the present disclosure.

In FIG. 2, a two-sided heat absorption panel 200 is visible. The absorption panel 200 includes a tube panel 210. The tube panel 210 has a first exposed face 222 and a second exposed face 224 (not visible; see FIG. 5) opposite the first exposed face. The term "exposed" refers to the fact that concentrated sunlight from heliostats can be directed against the face of the tube panel. The first face 222 and second face 224 may also be referred to as exterior faces, which also refers to their being able to receive concentrated sunlight from heliostats. The first face and the second face are generally planar surfaces. The tube panel 210 extends between an upper header 242 and a lower header 250. Put another way, the tubes in the tube panel are interconnected by at least one upper header and at least one lower header. It should be noted that in practice, the tube panel may include multiple upper headers and lower headers. The tube panel 210 also has an upper edge 212, a lower edge 214, a first side edge 216, and a second side edge 218. It should be noted that in this view, one can see through the structure between the tube panel 210 and the structural support frame 300.

A structural support frame 300 runs around the upper edge 212, the lower edge, the first side edge 216, and the second side edge 218 of the wing tube panel. The structural support frame 300 includes a first vertical column 310, a second vertical column 320, an upper horizontal beam 330, and a lower horizontal beam 380. The upper horizontal beam 330 extends between an upper end 312 of the first vertical column and an upper end 322 of the second vertical column. The lower horizontal beam 380 extends between a lower end 314 of the first vertical column and a lower end 324 of the second vertical column.

As seen here, the first vertical column 310 is adjacent the first side edge 216, the second vertical column 320 is adjacent the second side edge 218, the upper horizontal beam 330 is adjacent the upper edge 212 of the wing tube panel, and the lower horizontal beam 380 is adjacent the lower edge 214 of the wing tube panel. The wing tube panel 210 is connected to the structural support frame 300 through the upper header 242. Here, the wing tube panel is top supported. At least one panel support rod 202 extends between the structural support frame 300 and the upper header 242; three such panel support rods are shown here.

Generally, a wing tube panel 210 requires at least one tube pass 240, an upper header 242, and a lower header 250. HTF flows from the inlet header to the outlet header (e.g. here the upper header can be the inlet header) and is heated in the tube pass by solar energy from heliostats. Each tube pass 240 includes at least one tube, and generally includes a plurality of such tubes. In FIG. 2, the wing tube panel is shown with a plurality of tube passes (here four). The tube panels and tube passes contemplated herein are of loose tube construction to allow independent differential expansion between tubes, reducing tube stresses. The exposed faces of the tubes may be coated or painted to increase/maximize heat absorption, for example with a special high temperature black paint. Adjacent tube passes are arranged so that heat transfer fluid flows upward through one tube pass and down through another tube pass in a serpentine manner. Various fluid flow arrangements may be used to facilitate draining of the HTF and minimize the number of vent and drain valves. Arrows here illustrate one such fluid flow arrangement.

In FIG. 3, two stiffener structures are shown. Each stiffener structure preferably runs from the first side edge 216 to the second side edge 218 across the first face 222 and the second face 224 of the tube panel. Here, a first stiffener structure 401 is located at a first support elevation 225 and a second stiffener structure 402 is located at a second support elevation 226. The two stiffener structures are arranged in parallel. As explained further below, each stiffener structure is formed from two support assemblies, one support assembly on each face of the tube panel. Each support assembly includes a support tube. Here, support tube 400 is visible on this first face. The support tube 406 provides stiffener structures on the second face.

Generally, the number of stiffener structures can depend on the maximum unsupported length of the wing tube panel that will resist wind and seismic loads. In this regard, the wing tube panel 210 can be considered as being divided into an upper section 230, a middle section 232, and a lower section 234, which generally (but not necessarily) divide the exposed portion of the wing tube panel into equal sections along its height. The first stiffener structure 401 is shown in the upper section 230, and the second stiffener structure 402 is shown in the lower section 234. Put another way, the stiffener structures are typically not located in the middle section. This keeps the stiffener structures out of the peak heat flux zone and reduces their operating temperatures. It is contemplated that the stiffener structures will include support tubes that will be cooled by some heat transfer fluid, which could be the same as or different from the HTF that is passed through the wing tube panel. For example, the use of oil or water can eliminate the potential for molten salt freezing in the stiffener structure during startup and shutdown. Here, the stiffener structures are illustrated as being formed in part by a support tube 400 which is connected to the upper header 242 and lower header 250, which uses the same HTF as that passing through the tube panel 210. The stiffener structures 401, 402 are the portions of the support tube 400 that run across the face 222 of the tube panel 210. The circuitry is ultimately designed to minimize temperatures and stresses, allow independent thermal expansion of the stiffener structure, and minimize the potential for freezing of fluid during startup. The outer face of the stiffener structure can be painted or coated to reduce/minimize heat absorption.

In FIG. 4, the structural support frame (not visible; see FIG. 2) is shown with heat shields mounted to protect certain parts of the design from exposure to the concentrated sunlight coming from the heliostats. The structural support frame 300 is not visible in FIG. 4, but is visible in FIG. 2. Here, a first heat shield 340 frames the first face 222 of the wing tube panel 210. A second heat shield 360 (not visible; see FIG. 5) also frames the second face 224 of the wing tube panel. In this regard, the heat shield 340 includes an interior edge 342 that forms a window in the heat shield through which the wing tube panel 210 is visible. The heat shield 340 can be considered as including an upper face 352, a first side face 354, a second side face 356, and a lower face 358. Dotted lines show the outline of the wing tube panel 210, the upper header 242, and the lower header 250. As seen here, the interior edge 342 of the heat shield abuts the side edges 216, 218 of the wing tube panel, but could also be arranged with a gap or open space between the heat shield and side edges of the tube panel to allow more solar energy on the edge of the panel while reducing spillage onto the heat shields. Each heat shield 340, 360 could also be considered as having an upper face, a first side face, a second side face, and a lower face. The first heat shield and the second heat shield are generally made from a heat-resistant material. The heat shield(s) can also be coated or painted with a reflective high temperature white paint to decrease/minimize heat absorption and/or operating temperature.

Figure 5:
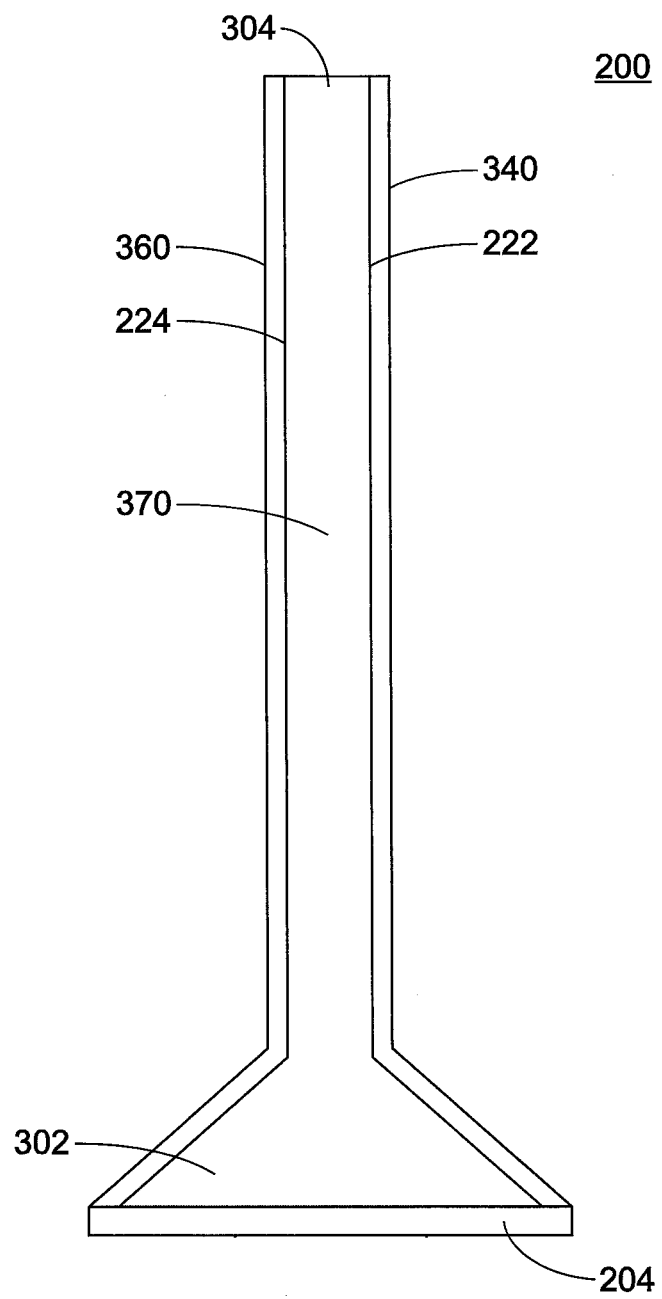
FIG. 5 is an exterior side view of the dual-exposure heat absorption panel of FIG. 4.

FIG. 5 is an exterior side view of the wing assembly. The first heat shield 340 and the second heat shield 360 are visible here. The exposed first face 222 and second face 224 are also indicated. The base 302 of the structural support frame and the apex 304 of the structural support frame are also indicated. It should be noted that a heat shield 370 is also present on the sides of the structural support frame 300.

Figure 6:
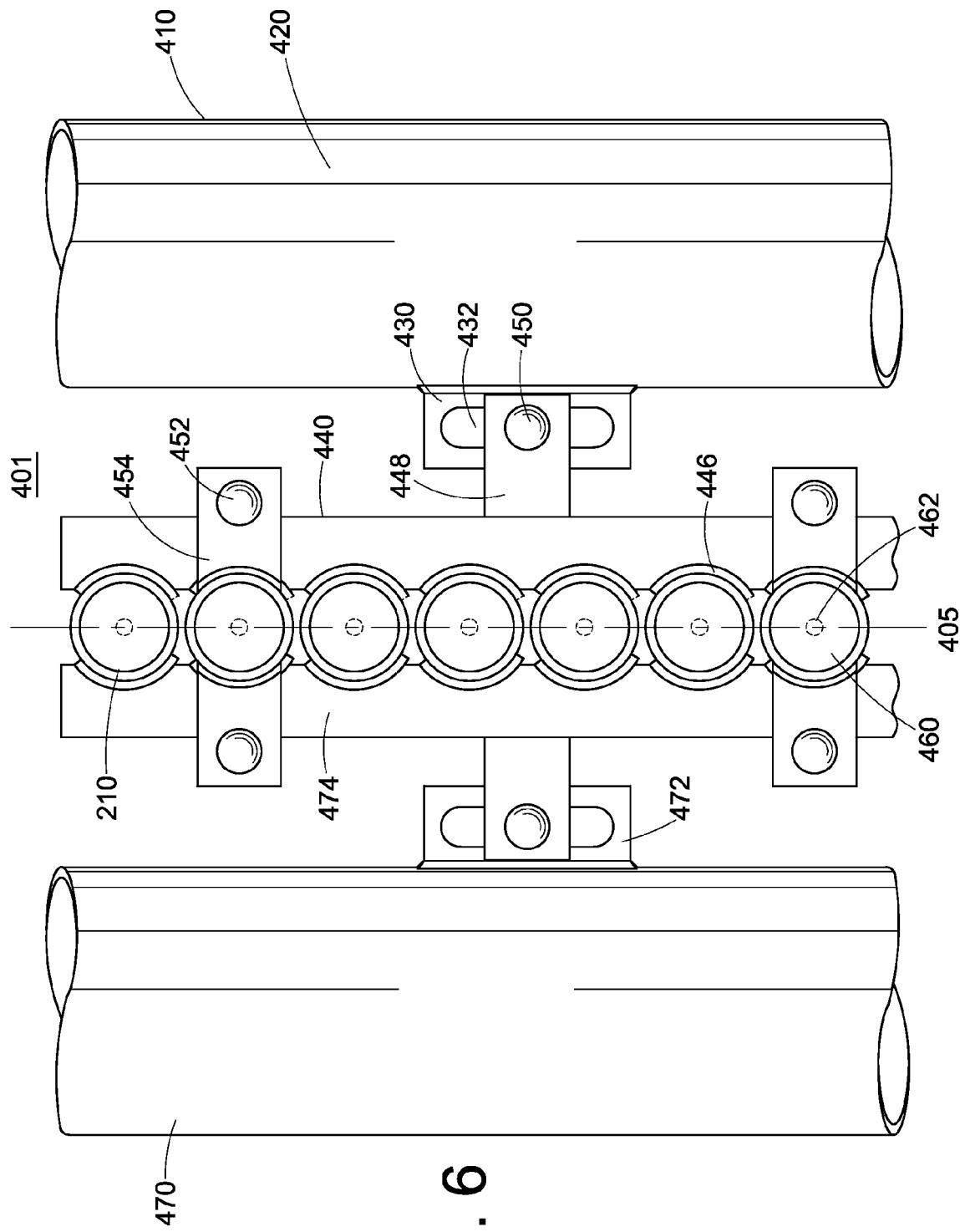
FIG. 6 is a plan view showing a portion of a wing tube panel and a portion of a stiffener structure for the wing tube panel.
Figure 7:
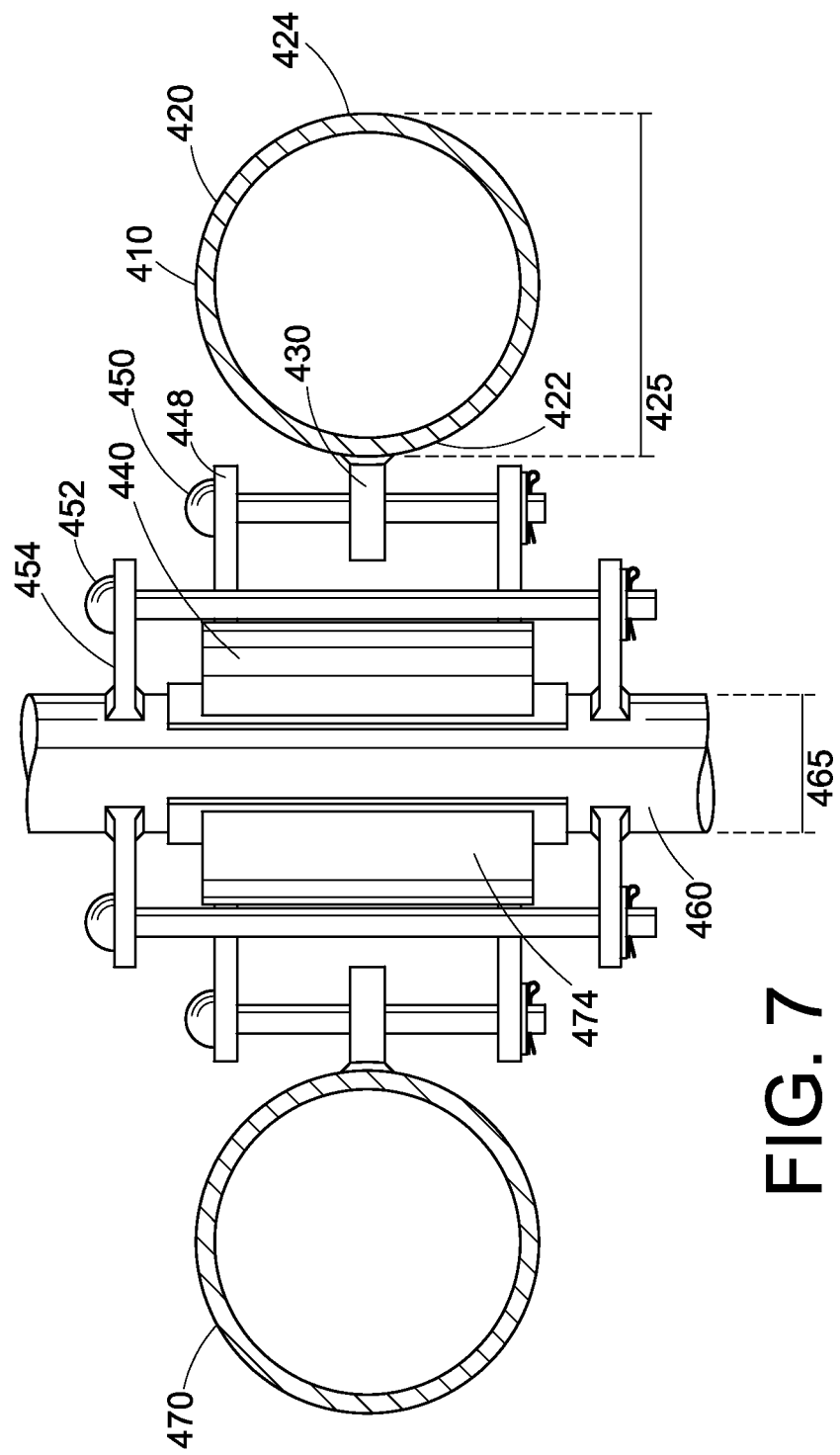
FIG. 7 is a side cross-sectional view of a portion of a tube panel and a portion of a stiffener structure for the tube panel as depicted in FIG. 6.
Figure 8:
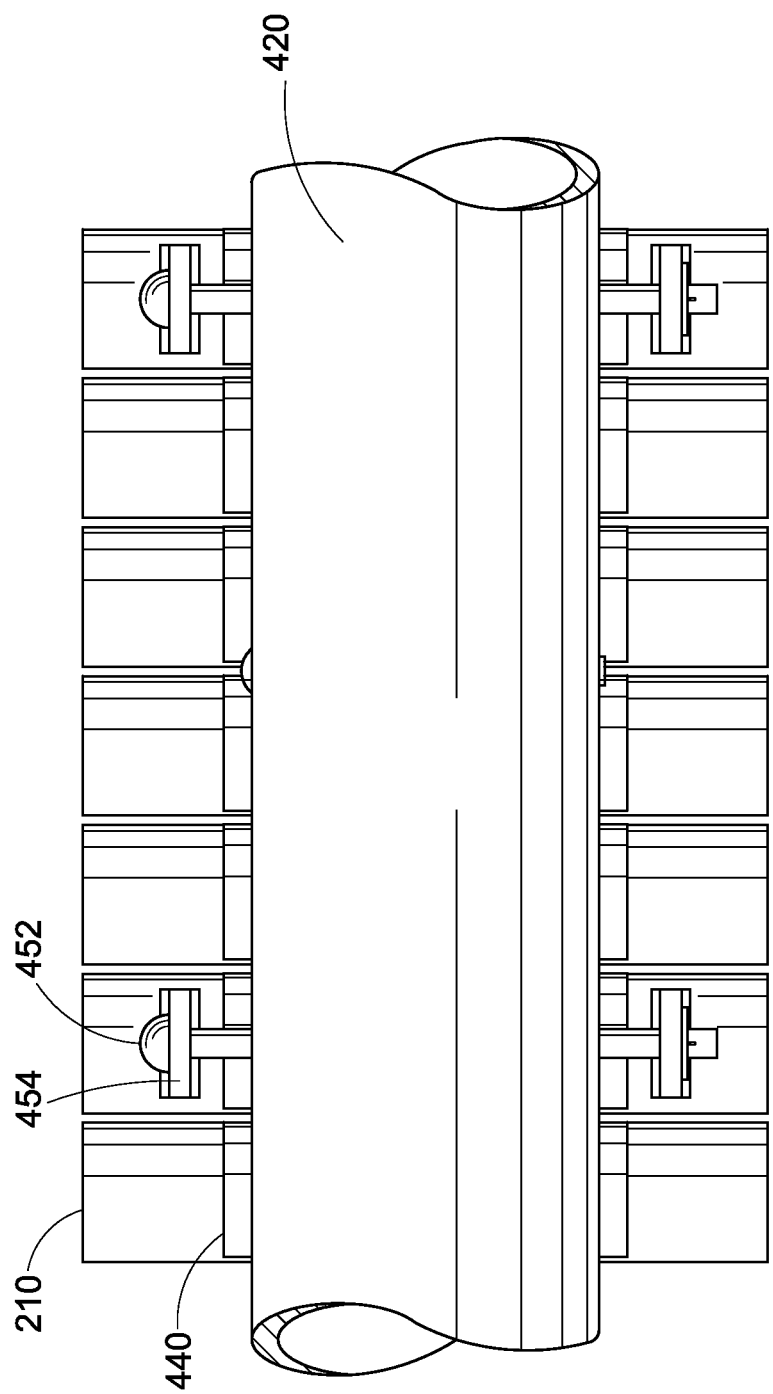
FIG. 8 is a front view of the portion of a wing tube panel and stiffener structure as depicted in FIG. 6.
Figure 8A:
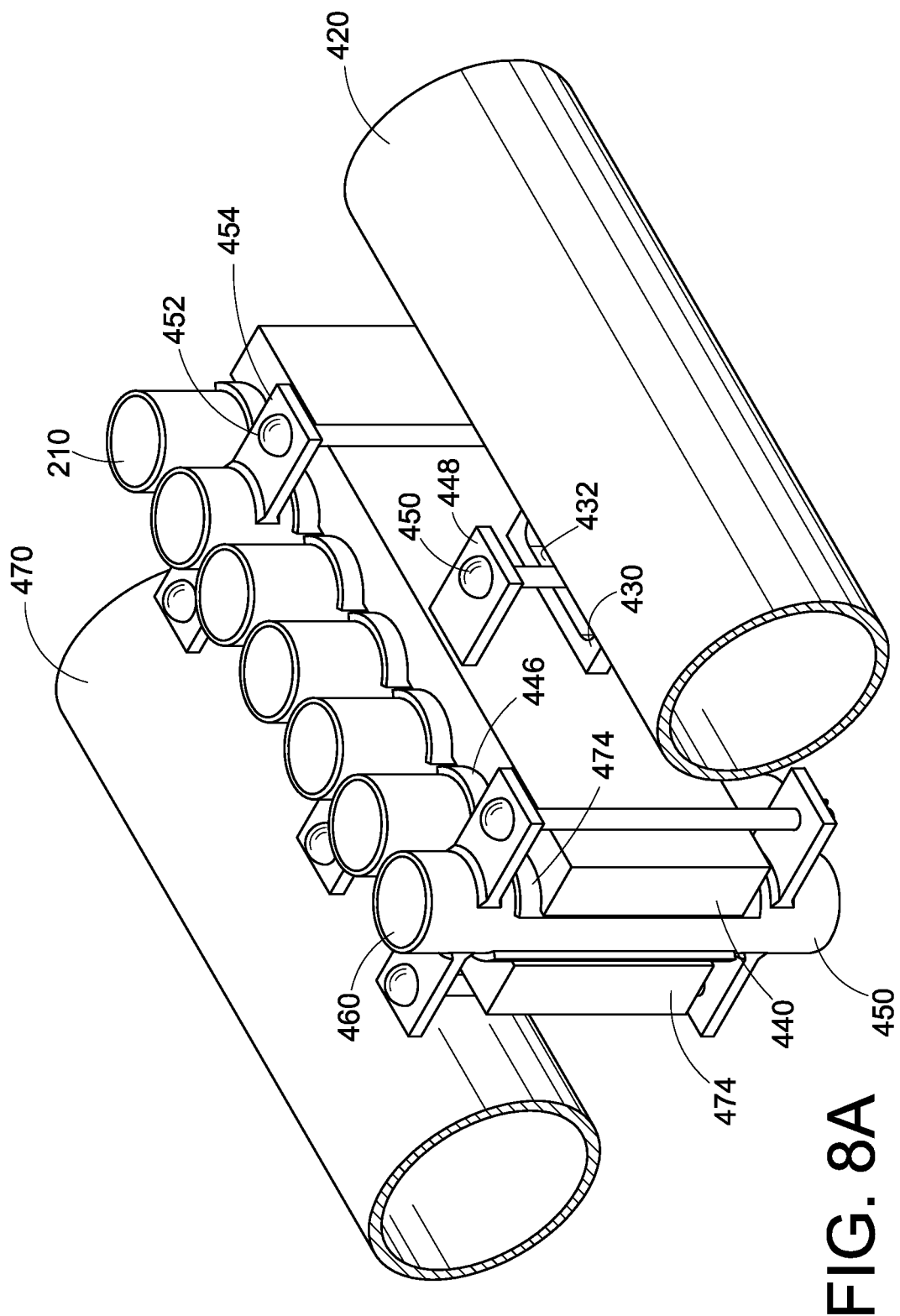
FIG. 8A is a perspective view of the portion of a wing tube panel and stiffener structure as depicted in FIG. 6.

As noted in FIG. 3, stiffener structures are used to support and strengthen the tube panel. FIGS. 6-8A are different views of one exemplary embodiment of a stiffener structure. FIG. 6 is a plan (i.e. top) view of the exemplary embodiment. FIG. 7 is a side cross-sectional view of the exemplary embodiment. FIG. 8 is a front view of the exemplary embodiment. FIG. 8A is a perspective view.

Referring to FIG. 6, the stiffener structure 401 is formed from a first support assembly 410 and a second support assembly 470, which are located on the opposite exposed faces of the tube panel. (Referring back to FIG. 3, the first support assembly 410 is part of the support tube 400, and the second support assembly 470 is part of the support tube 406.) Each support assembly 410 includes a support tube 420, horizontal flange 430, and scallop bar 440. The support tube 420 is contemplated to be hollow and allow a cooling fluid to pass through. A horizontal flange 430 extends from the support tube inwards towards the tube panel 210. The horizontal flange 430 has a slot 432 therein. As seen here, the horizontal flanges 430, 472 on the two support assemblies are opposed to each other. The scallop bar 440 has a contoured face that engages the tube panel 210, and lugs 448 on an opposite face. The scallop bar is connected to the support tube by a pin 450 which passes through the lugs 448 and the slot 432. The scallop bar is held snug (but not fixed) against the panel tubes 460 with pins 452 that pass through lugs 454 that are welded to some of the panel tubes, and the scallop bar engages one or more of the tubes. The lugs 454 holding the scallop bar 440 between the tubes 460 and pins 452 are offset from the lug 448 connecting the scallop bar 440 to the support tube 420. This allows the panel tubes and scallop bars to thermally expand in unison in the vertical direction, independent of the relatively stationary (in the vertical direction) support assembly. A protective sleeve 446 can be placed between the panel tube and the scallop bar as shown to protect the tubes from wear and/or gouging if any relative motion (sliding contact) occurs between the scallop bar and panel tubes. It is noted that only one pair of flanges and lugs 430, 478 is depicted here, but additional flanges and lugs may be present on each support assembly to resist panel twisting and maintain panel-to-panel alignment. Similarly, only one scallop bar 440 is shown attached to support tube 420, but multiple scallop bars could be used along the support tube to stiffen a single wide panel or multiple panels, for example, if there is a significant difference in vertical thermal expansion between tubes within a panel or between panels, as desired. Also, each scallop bar 440 could have multiple lugs 448. The stiffener structure can be supported by the structural support frame (see FIG. 3). The support tubes can be attached or connected to the vertical columns of the support frame, though they are not shown here as such.

The stiffener structure allows for independent thermal expansion of the individual tubes in the wing tube panel, as well as for independent thermal expansion of the stiffener structure and the support tubes. The pin/slot arrangement between the scallop bar and the support tube permits the support tubes to thermally expand axially independently of the radial expansion of the tubes in the wing tube panel. (Note the axis of the support tube is horizontal and perpendicular to the vertical axis of the tubes in the wing tube panel.)

The support system described above allows the individual tubes 460 to be arranged in a tangent tube fashion with minimal gap between the tubes. This reduces energy loss from light passing through the gaps and therefore increases receiver heat absorption and efficiency. The individual tubes 460 are seen here with their centers 462 along the midline 405 of the tube panel. Other variations on the tube layout are also contemplated.

Referring now to FIG. 7, in some embodiments, the support tube 420 of the support assembly could have a different diameter 425 from the diameter 465 of any tube 460 in the tube panel to provide the support tubes with additional stiffness and in order to stiffen the panel and shade the parts associated with the support assembly, thus reducing part operating temperatures. In some embodiments, the support tube diameter 425 is larger than the diameter 465 of any tube 460 in the tube panel. The support tube 420 can also be considered as having an inner face 422 and an outer face 424, the outer face being exposed to reflected sunlight from the heliostats. The outer face 424 of the support tube can be coated or painted to decrease/minimize heat absorption and/or operating temperature.

Referring to FIG. 3, at least three variations on the stiffener structures are specifically contemplated. First, the support tubes 400, 406 that make up the stiffener structures 401, 402 are illustrated as being connected to the upper header 242 and the lower header 250, so that they use the same HTF as flows through the tube panel 210. However, other embodiments are contemplated in which the support tubes use a different cooling fluid. This could be accomplished, for example, by connecting the support tubes to separate headers. Second, support tube 400 is illustrated here as contributing the support assembly to both stiffener structures 401, 402. In other embodiments, the stiffener structures could be made using separate support tubes. For example, a support tube could run across the first support elevation 225, but would not run back across the second support elevation 226; a different support tube could be used for the stiffener structure at the second support elevation if necessary. Third, as illustrated here a stiffener structure 401 uses two separate support tubes 400, 406. Other embodiments are contemplated where only one support tube is used for the stiffener structure. This could be done, for example, by forming the support tube as a rectangular torus that surrounds the tube panel. This single support tube would provide the stiffener structure 401 adjacent to the first face of the panel and then wrap around the panel at the same elevation and provide the stiffener structure adjacent to the opposite face of the tube panel. This could be done at the second stiffener structure elevation 402 also by the same support tube or a different support tube.

It is also noted that in FIG. 3, each support tube connects to the upper header and the lower header on the same side of the tube panel. For example, support tube 400 connects to both the upper header 242 and the lower header 250 along first side edge 216. It should be understood that this may differ. For example, if only one stiffener structure is present, support tube 400 could connect to the upper header 242 along first side edge 216, then cross the first face and connect to the lower header along second side edge 218.

As discussed above, the solar receivers of the present disclosure include a wing assembly and a central receiver assembly. Some different central receiver assemblies are now described.

FIG. 9 is an exploded cross-sectional view of the various components of one exemplary embodiment of the central receiver assembly. In this exemplary embodiment, it is contemplated that the heat transfer fluid (HTF) is steam and water. Generally, the central receiver assembly 800 has an internal support structure 810 and at least one central tube panel 820.

The internal support structure 810 depicted here has a rectangular shape when viewed from the side and a square shape when viewed from above (i.e. a plan view). The internal support structure 810 here is assembled from four vertical pylons 812 and three elevations of buckstays 814 arranged horizontally between the pylons. The vertical pylons are attached to a base 816. The internal support structure 810 defines an interior volume 811 in which components of the solar receiver can be located and not exposed to concentrated sunlight. For example, here a vertical steam/water separator 802 is located within the interior volume 811. The interior volume 811 is protected from concentrated sunlight by the exterior tube panels and by barriers that block light that passes between the tangential, loose tubes. Access platforms 818 are shown here at two levels to provide access to the volume of the internal support structure.

The solar receiver depicted here has two different sets of central tube panels 820, which serve as evaporator tube panels 822 and superheater tube panels 824. Each central tube panel 820 extends between an upper header 826 and a lower header 828. The vertical steam/water separator 802 is structurally and fluidly interconnected to the tube panels 822, 824. The internal support structure 810 supports the vertical steam/water separator 802 and the central tube panels 820. The central tube panels 820 are mounted to the internal support structure 810 at the buckstays 814.

As depicted here, each side of the solar receiver 800 comprises one evaporator tube panel 822 and one superheater panel 824. Two primary superheater (PSH) panels 824 form one corner of the central receiver assembly 800 and two secondary superheater (SSH) panels 824 form an opposite corner (not shown). To allow for flexibility of the tubes, the evaporator panels 822 and superheater panels 824 are typically constructed of closely spaced tangent loose tubes (no membrane) with generous tube bends near the headers for additional flexibility. The tubes can be small-diameter thin-wall tubes to minimize hot-to-cold-side and through-tube-wall temperature differentials and thermal stress. The tube panels can thermally expand in both the horizontal and vertical directions, thereby minimizing tube stresses. Other arrangements of the evaporator tube panels 822 and superheater panels 824 are also contemplated. For example, the evaporator panels 822 and superheater panels 824 may not be placed on every side, or the superheater panels 824 may not meet at a corner, or there may even be different configurations of plural evaporative 822 and superheater panels 824 provided on a given side.

The upper headers 826, lower headers 828, and other components are protected from spillage and stray light energy by heat shields that extend around the perimeter of the central receiver assembly 800. An upper heat shield 840 is located above the central tube panels 820, and a lower heat shield 842 is located below the central tube panels 820. The exposed side of the heat shields can be painted white to reduce operating temperatures. The back side of the heat shields is typically not insulated to reduce operating temperatures. A gap may also be present between the heat shields 840, 842 and the central tube panels 820 to allow natural air flow for additional cooling.

An explanation of the fluid flow may be helpful in explaining the connections between the various components. The central receiver assembly 800 is designed for natural circulation and does not require a circulating pump, though one may be provided. Feedwater enters the vertical separator 802 near mid height of the receiver 800. This relatively cool water flows downwards through a downcomer pipe (not shown) at the bottom of the vertical separator. Supply pipes 850 carry the water from the downcomer pipe to the lower headers of the evaporator panels 822. The solar energy/heat from the heliostats is absorbed by the water flowing upward though the tubes in the evaporator panels 822, which is lower in density than the water leaving the vertical separator 802, resulting in a natural pumping action. The water-steam mixture exits the headers at the top of the evaporator panels 822. Risers 852 carry the water-steam mixture to the vertical separator 802, which separates the mixture into water and dry saturated steam. The water removed flows downward in the vertical separator 802 for recirculation.

The dry saturated steam leaves the top of the vertical separator 802 and flows through saturated steam piping 854 to inlet headers at the top of the primary superheater panels 824. Steam flows through the tube passes of the primary superheater panels 824 in parallel, starting adjacent the evaporator panels 822. This arrangement puts the coldest steam next to the evaporator panels 822 to protect the superheater panels 824 from spillage during startup. As the steam flows through the primary superheater panels, solar energy/heat from the heliostats is absorbed by the steam in order to raise the temperature above saturation. Steam then exits the primary superheater panels 824, mixes and flows though the attemperator 856 and associated piping 858, then splits and enters secondary superheater panels (not visible) at the top. The secondary superheater panels are located on an opposite corner of the central receiver assembly 800. Similar to the primary superheater, steam flows through the tube passes of the secondary superheater panels in parallel, starting adjacent the evaporator panels. This arrangement puts the coolest steam of the secondary superheater next to the evaporator panels to protect the superheater panels from spillage during startup. As the steam flows through the passes of the secondary superheater, solar energy/heat from the heliostats is absorbed by the steam in order to further raise the temperature. The final superheated steam can leave the central receiver assembly 800 (and the solar receiver) via a main steam pipe (not shown).

Figures 10A, 10B:
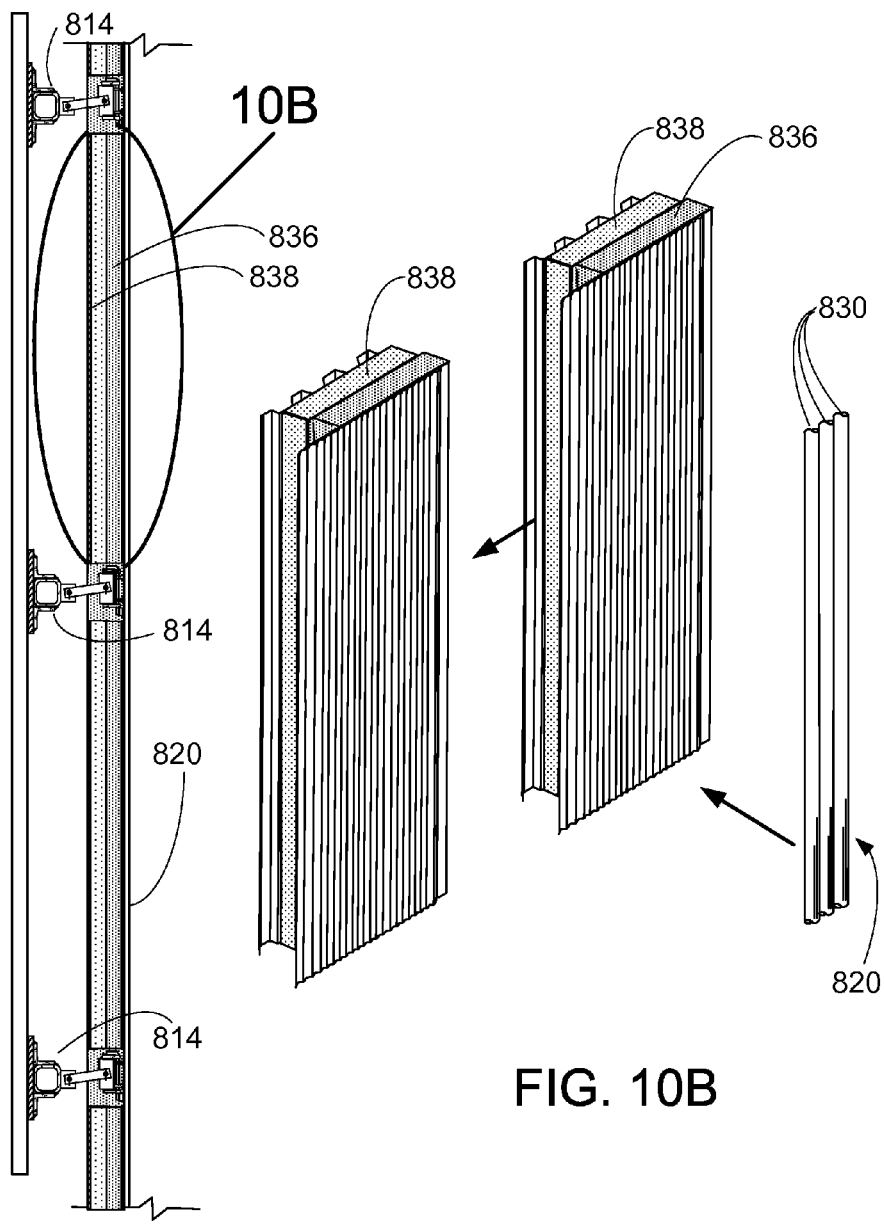
FIG. 10A is a side cross-sectional view of a central tube panel mounted on the central receiver assembly.
FIG. 10B is a magnified perspective exploded view of the tube panel of FIG. 10A.

FIG. 10A is a side view of a central tube panel 820 which utilizes one sided heat absorption, and FIG. 10B is an enlarged perspective exploded view of the central tube panel. A reflective modular panel light barrier 836 is located behind the tubes 830 (i.e. the non-exposed face of the central tube panel) opposite the heat absorbing (i.e. exterior) side of the tube panel. This light barrier is designed to protect the insulation 838, support structure 810, and the interior parts of the solar receiver from rain and heat exposure that may travel through the gaps between the loose tangent tubes of the tube panels. The modular design of the light barrier simplifies removal for inspections and/or maintenance. The light barrier 836 is composed of an array of metal sheets and may be coated with white paint or other reflective material on the tube side to maximize reflectance of light energy back to the tubes and reduce operating temperatures of the barrier plate. The light barrier is supported by the tube attachment structure, i.e. the buckstay support system 814. Behind the light barrier (i.e. further interior of the solar receiver) is the insulation 838, which is covered by lagging.

Figure 11:
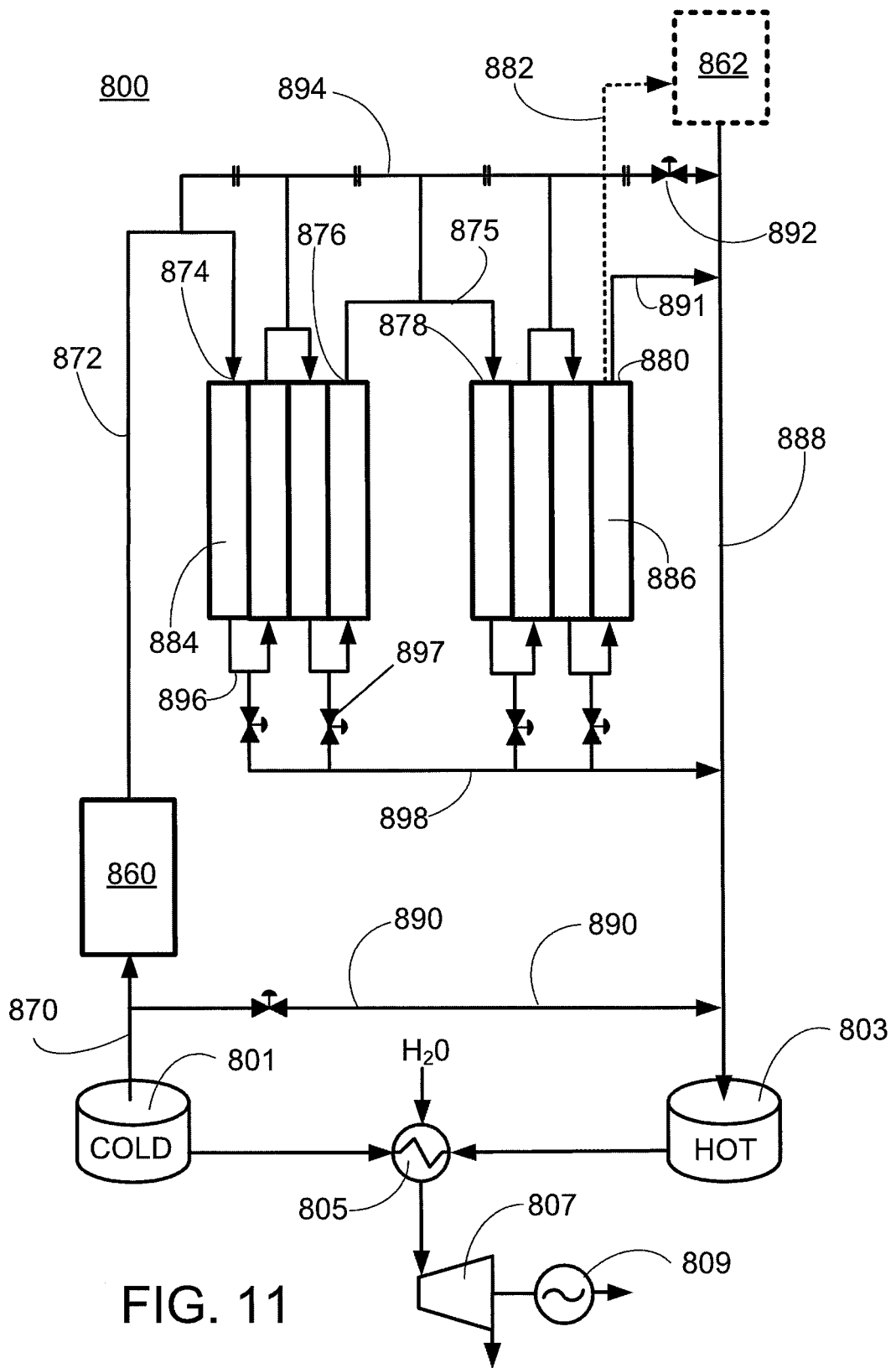
FIG. 11 is a schematic diagram of fluid flow through a central receiver assembly using molten salt as a heat transfer fluid.

Alternatively, in another exemplary embodiment of the solar receiver it is contemplated that the heat transfer fluid (HTF) is molten salt. FIG. 11 is a schematic diagram illustrating fluid flow through the central receiver assembly 800 using molten salt. In this diagram, the fluid flows through two sides (i.e. two tube panels 884, 886) of the solar receiver. A second parallel and independently controlled flow path through the other two sides of the receiver is not shown but is identical. Initially, a riser 870 provides cold molten salt to a molten salt inlet vessel 860 from cold storage tank 801. For example, "cold" molten salt may be pump from the cold storage tank having a temperature of about 550° F. An inlet pipe 872 fluidly connects the inlet vessel 860 to a first tube panel inlet 874. The jumper pipes 896 between tube passes is also illustrated. The first tube panel outlet 876 is fluidly connected to a second tube panel inlet 878 through a crossover pipe 875. An outlet pipe 882 fluidly connects the second tube panel outlet 880 to a molten salt outlet vessel 862. The HTF can flow from the inlet vessel 860 through the first tube panel 884 and the second tube panel 886 to the outlet vessel 862. A downcomer pipe 888 leads from the outlet vessel 862 back down to grade, where the "hot" fluid can flow into hot storage tank 803.

The outlet pipe 882 and outlet vessel 862 are optional and not required, which is indicated by dotted line. Without an outlet vessel, the HTF flows from the second tube panel outlet 880 directly to the downcomer pipe 888 via outlet pipe 891. A bypass line 890 also connects the riser 870 to the downcomer pipe 888. If desired, this bypass flow path can prevent the HTF from flowing through the tube panels 884, 886.

This completes the energy collection process. The stored thermal energy in the heat transfer fluid can be used to generate steam and electricity. This is done by, for example, pumping the hot HTF from the hot storage tank 803 through the shell side of a heat exchanger 805. Water enters the tube side of heat exchanger 805 and is converted to steam. The steam can be sent to turbine 807, which drives an electrical generator 809. The cooler HTF leaving the heat exchanger then returns to the cold storage tank 801, where it is pumped to the receivers to repeat the energy collection process described above.

For a molten salt receiver, the tube panels must be fully drainable and ventable. The receiver is usually drained when not in use, at sunset, or when available solar energy is too low. Molten salt solidifies at approximately 430° F. (221° C., 494° K.). If not drained, the salt can freeze inside the tubes, plug the receiver, and could rupture the tubes. As seen here, the solar receiver can include a vent valve 892 for each independent flow path which are both vented through the top of the downcomer pipe 888. The vent valve is typically located near the top of the downcomer pipe 888, and the vent piping 894 is also illustrated connecting the flow path to the downcomer pipe. One drain valve 897 is typically provided for each pair of tube panels, and are located beneath the tube panels. The drain piping 898 is also illustrated, and connects to the downcomer 888 so that molten salt present in the tube panels drains and flows into the downcomer pipe 888. The vent valves and drain valves are automated.

It should be noted that in FIG. 11, the various pipes are illustrated as being relatively straight fluid paths. However, it will be appreciated by those skilled in the art that their actual design in terms of arrangement and length will be determined by the degree of flexibility required to accommodate expected motions caused by thermal expansion and contraction during operation of the solar receiver. It is thus likely that additional bends or length may be necessary to provide such flexibility.

Figure 12:
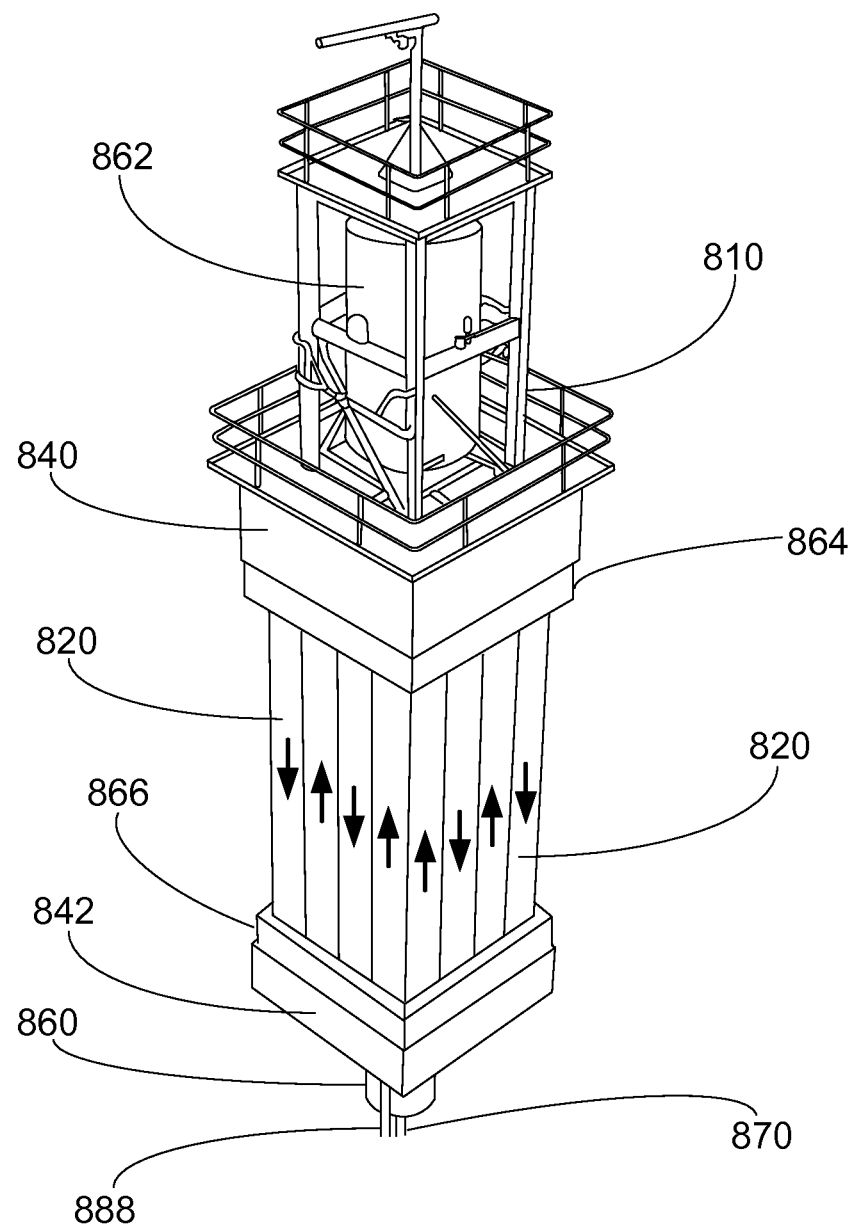
FIG. 12 is a perspective view of an assembled central receiver assembly using molten salt as a heat transfer fluid.

FIG. 12 is a perspective view of an assembled central receiver assembly that uses molten salt. At the bottom, the riser 870 enters the inlet vessel 860. The molten salt inlet vessel 860 is located below the optional outlet vessel 862. The inlet vessel 860 is also located below the central tube panels 820. Put another way, the central tube panels 820 are located (both structurally and fluidly) between the inlet vessel 860 and the optional outlet vessel 862. The downcomer 888 is also visible. An upper oven box 864 encloses the upper headers of the central tube panels 820. A lower oven box 866 encloses the lower headers of the central tube panels 820. In this regard, the oven boxes use electric heater elements to preheat the areas of the central tube panels 820 that are not exposed to concentrated solar heat flux prior to filling. Preheating is necessary at startup to ensure that all metal which comes in contact with the HTF is heated to at least the temperature associated with the cold HTF prior to introduction of the HTF through the central receiver assembly 800. The upper heat shield 840 is located above the upper headers of the central tube panels 820 and above the upper oven box 864. The lower heat shield 476 is located below the lower headers of the central tube panels 820 and below the lower oven box 866. At the top of the central receiver assembly, the internal support structure 810 is visible, as is the optional outlet vessel 862.

FIGS. 13-17 illustrate various views of an exemplary embodiment of a solar receiver of the present disclosure. The solar receiver includes a central receiver assembly and at least one wing assembly. Generally, there is one wing assembly for each corner of the central receiver assembly. In the depicted embodiment, the central receiver assembly has a square shape and there are four wing assemblies.

Figure 13:
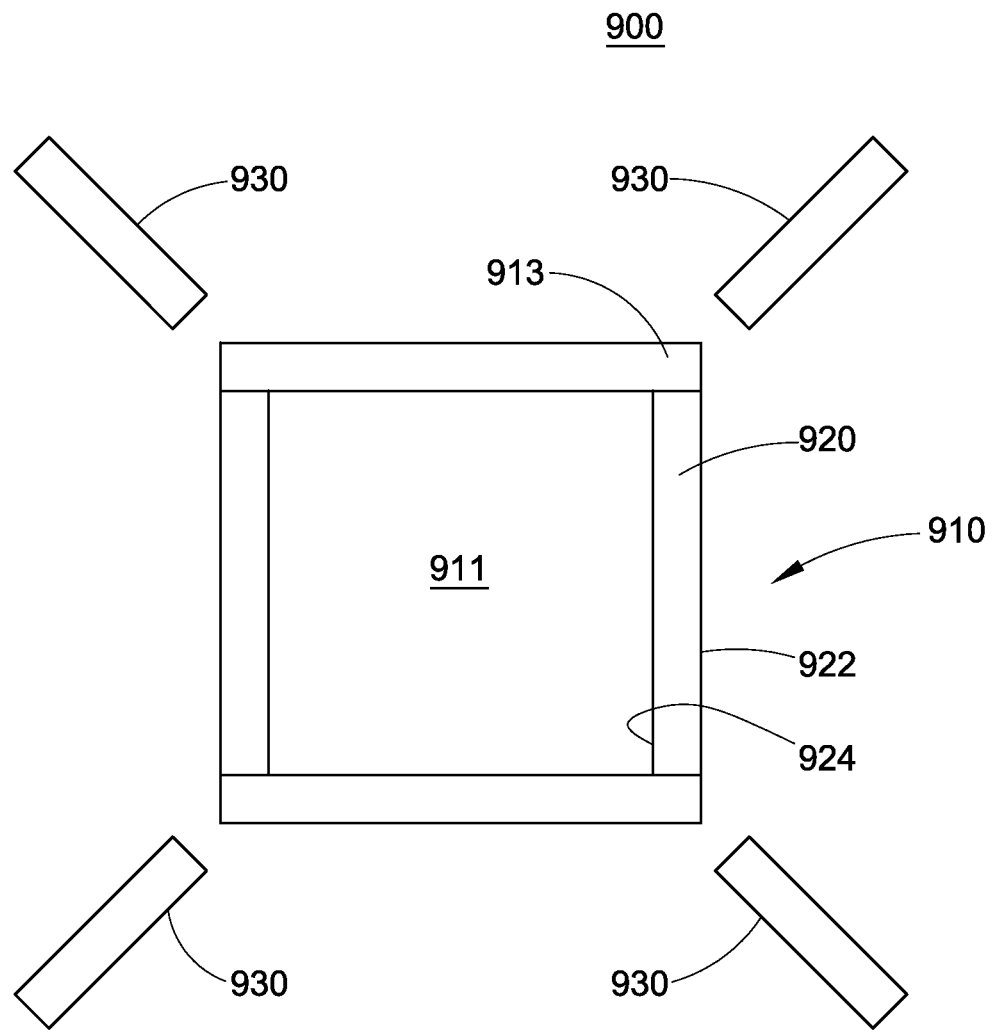
FIG. 13 is a plan view of a solar receiver of the present disclosure including a central receiver assembly and a wing assembly.

FIG. 13 is a plan view of the solar receiver 900 showing the tube panels 920 in the four-sided central receiver assembly 910 and four wing assemblies 930, with supporting structures removed. The four sides of the central receiver assembly are central tube panels 920 having an exposed first face 922 on the exterior and a non-exposed second face 924 on the interior of the central receiver assembly. An interior volume 911 is present in the central receiver assembly. A wing assembly 930 extends from each corner 913 of the central receiver assembly. A wing assembly in this four-sided configuration is perpendicular to adjacent wing assemblies. Generally, the central receiver assembly could be any n-sided polygonal shape with any quantity of wing assemblies.

Figure 14:
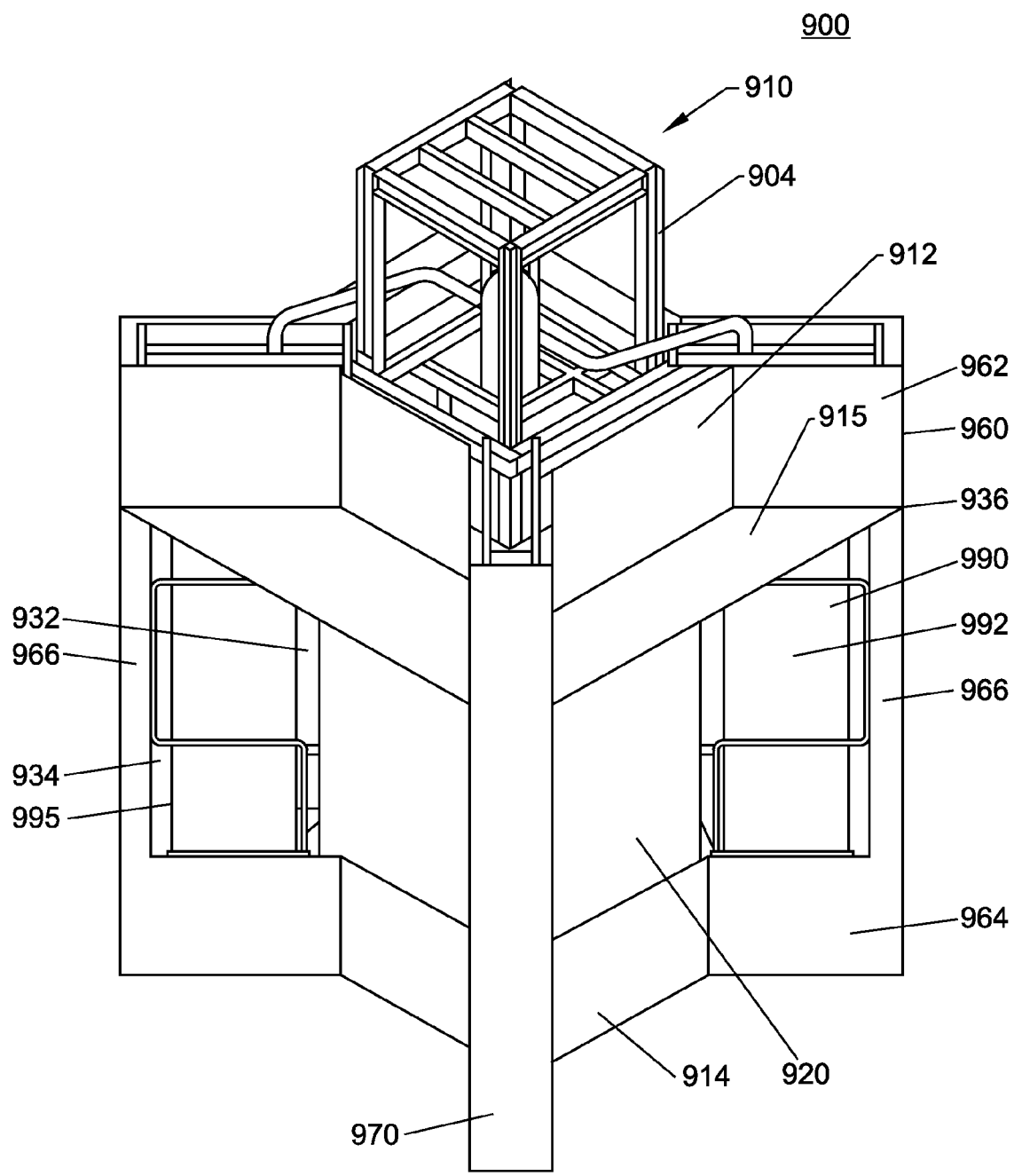
FIG. 14 is an isometric view of the solar receiver of FIG. 13 with heat shields in place.
Figure 15:
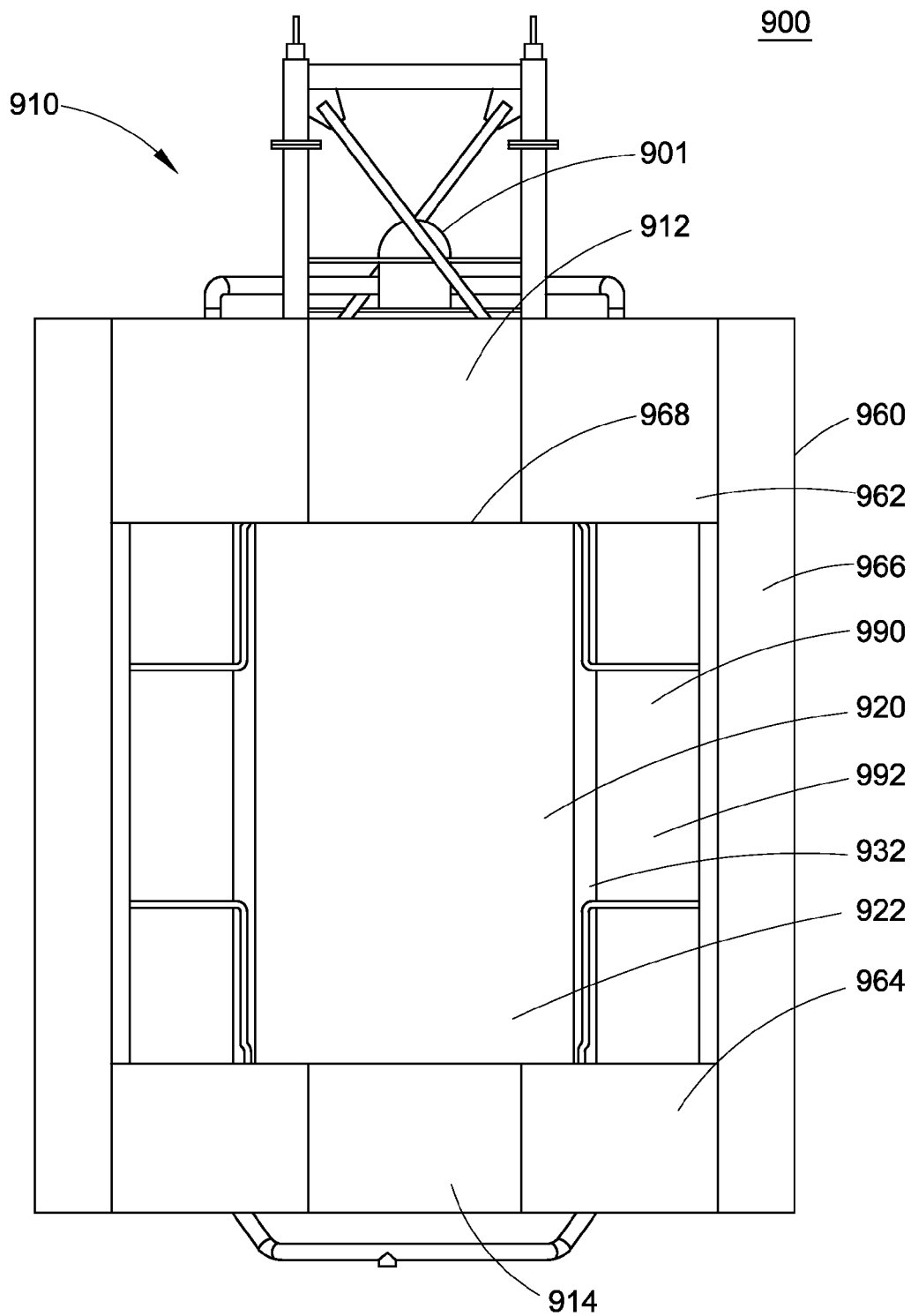
FIG. 15 is a front view of the solar receiver of FIG. 13 with heat shields in place.

FIG. 14 is an isometric side view of the solar receiver with the heat shields in place. FIG. 15 is a front view of the solar receiver with the heat shields in place. The central receiver assembly 910 has an upper heat shield 912 located above the central tube panel 920, and a lower heat shield 914 located below the central tube panel. A heat shield 960 frames each exposed face 992, 994 of the wing tube panel 990. The heat shield 960 can be considered as including an upper face 962, a lower face 964, and a side face 966. The side face 966 of the wing assembly heat shield is located distal from the central receiver assembly. A side heat shield 970 on the side of the wing assembly 930 is also visible.

Referring to FIG. 14, an inner open space 932 is visible between the central tube panel 920 and the wing tube panel 990, and no heat shield is present in this area. An outer open space 934 is also present between the side face 966 of the wing assembly heat shield and the side edge 995 of the wing tube panel. These open spaces create a free-standing wing tube panel. This arrangement allows the heliostats to be focused more uniformly across the width of the wing tube panel, which generally requires some heliostats to be focused towards the edges. The open spaces provide a buffer that reduces spillage of concentrated sunlight upon the heat shields. The concentrated sunlight can pass through the open space from one side of the wing tube panel to the other side. However, it is possible that the concentrated sunlight passing through will hit another tube panel on the solar receiver, depending on the orientation and direction of the concentrated sunlight.

A horizontal heat shield 915 is located above the central tube panel 920 as well, and extends to the distal end 936 of the wing assemblies. The horizontal heat shield 915 is located at an elevation that frames the central tube panel, or along the inside edge 968 of the wing assembly heat shield (see FIG. 15). The upper heat shield 912 of the central receiver assembly, the lower heat shield 914 of the central receiver assembly, and the heat shield 970 of the wing assembly can all be coated/painted to reduce/minimize heat absorption. The exposed first face 992 and exposed second face 994 of the wing tube panel 990 can be coated/painted to increase/maximize heat absorption, as can the first exposed face 922 (see FIG. 15) of the central tube panel 920.

Figure 16:
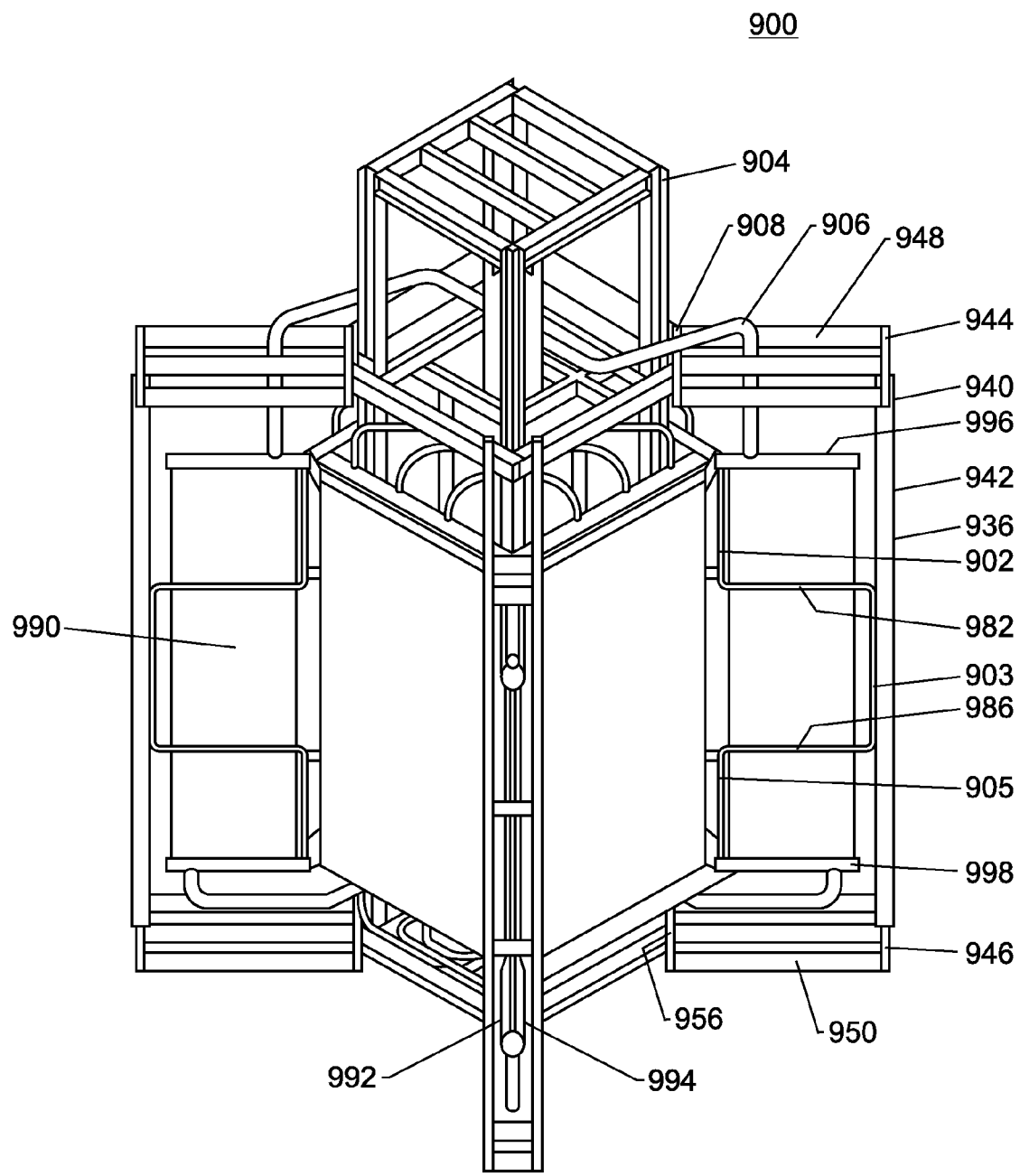
FIG. 16 is an isometric view of the solar receiver of FIG. 13 with heat shields removed.
Figure 17:
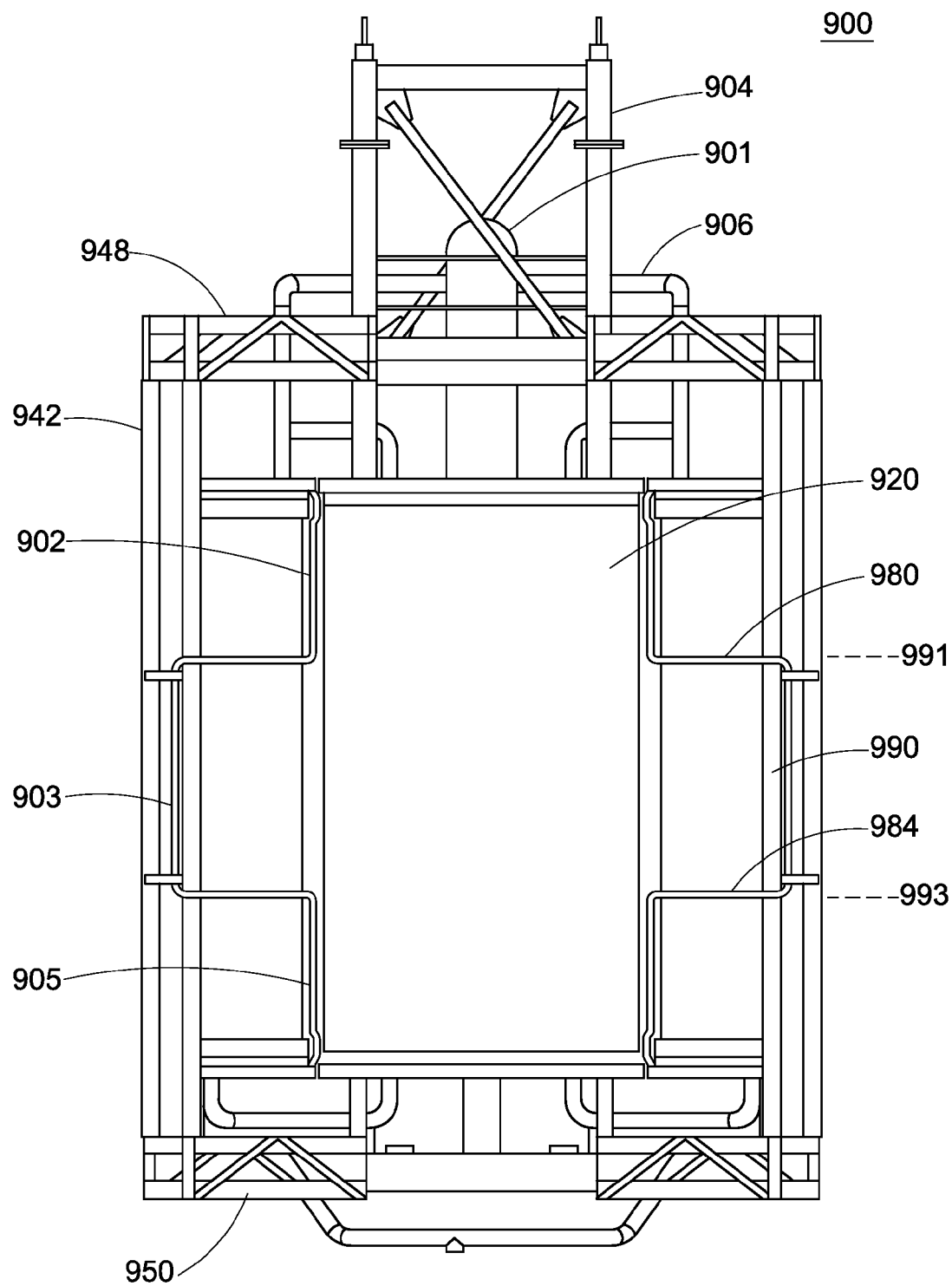
FIG. 17 is a front view of the solar receiver of FIG. 13 with heat shields removed.

FIG. 16 is an isometric side view of the solar receiver with the heat shields removed to reveal some of the underlying structure. FIG. 17 is a front view of the solar receiver with the heat shields removed.

The embodiment depicted here is a steam/water solar receiver with water as the HTF, so a vertical steam/water generator 901 is included (see FIG. 15). The internal support structure 904 of the central receiver assembly is also visible, and extends above the tube panels. The structural support frame 940 for the wing assembly depicted here includes a first vertical column 942 at a distal end 936. An upper horizontal beam 948 extends from an upper end 944 of the first vertical column to an upper connection on the internal support structure (reference numeral 908). A lower horizontal beam 950 is located below the wing tube panel, and extends from a lower end 946 of the first vertical column to a lower connection (reference numeral 956) on the internal support structure 904. As shown here, the lower horizontal beam is connected but not fixed to the internal support structure to allow for differential thermal expansion; however, other such embodiments are contemplated. The upper horizontal beam 948 and lower horizontal beam 950 are generally parallel to each other, though this is not required.

Also visible in FIG. 16 and FIG. 17 is a first stiffener structure 980 and a second stiffener structure 984, which are located at a first support elevation 991 and a second support elevation 993 on the wing tube panel. These stiffener structures are like that described in FIGS. 6-8A, and the first support assembly 982, 986 of each stiffener structure is visible. It should be noted that here, the first support assembly 982 of the first stiffener structure is fluidly connected to the first support assembly 986 of the second stiffener structure through an intermediate pipe 903. In addition, the first support assembly 982 of the first stiffener structure is fluidly connected to the upper header 996 of the wing tube panel through an inlet pipe 902. The first support assembly 986 of the second stiffener structure is fluidly connected to the lower header 998 of the wing tube panel through an outlet pipe 905. In this regard, heat transfer fluid can flow through the support tube of the support assembly to cool the support assembly. Alternatively, the support assemblies of either stiffener structure can be fluidly connected a central tube panel on the central receiver assembly.

Because this depicted embodiment is a steam/water solar receiver with water as the HTF, saturation piping 906 is visible extending from the top of the vertical separator 901 to the upper headers 996 of the wing tube panels. In this regard, the central tube panels are being used as evaporator panels to convert water into a water/steam mixture. The wing tube panels are then used as superheater panels. Alternatively, the central tube panels could be used as superheater panels, and the wing tube panels used as evaporator panels. A molten salt solar receiver would be arranged similarly but there would not be a vertical separator, and salt piping would connect the wing panels to the central tube panels.

It should be noted that the construction of the central tube panels can differ from the construction of the wing tube panels. In particular embodiments such as steam/water solar receivers, the tubes in the central tube panel may have helical internal ribs, or in other words helical internal ribbed tubing may be used for the central tube panel, particularly when these panels are used as evaporator panels. This allows a higher heat input in the central tube panels, which are heated on only one side, which increases the maximum practical heating efficiency. This allows the solar receiver to be designed for either natural or forced circulation with incident heat fluxes that can be two or three times greater compared to smooth bore tubes. Alternatively, coil-spring wire inserts, twisted tape inserts, longitudinal internal fins, porous surface coatings, machined surface features, or any other internal flow heat transfer enhancement scheme could be used in the tubes of the central tube panel. Such enhancements are not used on the wing tube panel because it is already exposed to twice the concentrated sunlight and can absorb the increased heat flux due to reduced thermal stresses (due to exposure on both faces). The resulting solar receiver can obtain significantly higher efficiency in capturing the available solar energy, allowing the size of the overall solar receiver to be decreased while still capturing the same total amount of solar energy, or allowing a receiver of equivalent size to capture more solar energy.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A solar receiver, comprising:
a central receiver assembly comprising an internal support structure and at least one external central tube panel, the internal support structure defining an interior volume, the at least one external central tube panel comprising a plurality of vertical tubes for conveying a heat transfer fluid, wherein the tubes are interconnected by at least one upper header and at least one lower header, and being arranged on an exterior face of the internal support structure with the at least one external central tube panel having an exposed first face and a non-exposed second face;
at least one wing assembly extending from the central receiver assembly, each wing assembly having a wing tube panel that comprises a plurality of vertical tubes for conveying a heat transfer fluid, wherein the tubes are interconnected by at least one upper header and at least one lower header, and each wing tube panel having a first exposed face and a second exposed face opposite the first face; and
at least one stiffener structure running from a first side edge to a second side edge across the first exposed face and the second exposed face of the wing tube panel at a first support elevation, the at least one stiffener structure formed from a first support assembly on the first face of the wing tube panel and a second support assembly on the second face of the wing tube panel, wherein each support assembly includes a support tube, a horizontal flange extending from the support tube and having a slot therein, and a scallop bar engaging the tube panel and having at least one lug, the scallop bar engaging the horizontal flange by a pin passing through the at least one lug and the slot of the horizontal flange.

2. The solar receiver of claim 1, wherein the wing assembly further comprises a structural support frame, the structural support frame including:
a first vertical column;
an upper horizontal beam extending from an upper end of the first vertical column to an upper connection on the internal support structure; and
a lower horizontal beam extending from a lower end of the first vertical column to a lower connection on the internal support structure.

3. The solar receiver of claim 1, wherein the support tube of each support assembly has a larger diameter than any tube in the wing tube panel.

4. The solar receiver of claim 1, wherein the first support assembly of the first stiffener structure is fluidly connected to an inlet header of the wing tube panel or is fluidly connected to the at least one external central tube panel.

5. The solar receiver of claim 1, further comprising a second stiffener structure running from the first side edge to the second side edge across the first face and the second face of the wing tube panel at a second support elevation.

6. The solar receiver of claim 5, wherein the first support elevation and the second support elevation are not located at a middle section of the wing tube panel.

7. The solar receiver of claim 1, wherein the first face and the second face of the wing tube panel are painted to increase heat absorption.

8. The solar receiver of claim 1, wherein the at least one external central tube panel comprises wall tubes having helical internal ribs.

9. The solar receiver of claim 1, wherein the internal support structure has a rectangular cross-section, the central receiver assembly has four external central tube panels, and a total of four wing assemblies extend from corners of the central receiver assembly.

10. A solar energy system, comprising:
a solar receiver according to claim 1; and
a field of heliostats configured to direct sunlight towards the first face of the central tube panel, the first face of the wing tube panel, and the second face of the wing tube panel.

11. The solar receiver of claim 1, wherein the first support assembly of the first stiffener structure is fluidly connected to an inlet header of the wing tube panel or is fluidly connected to the at least one external central tube panel.

12. The solar receiver of claim 1, wherein the first support assembly conveys a second heat transfer fluid that is different from the heat transfer fluid conveyed by the wing tube panel.

13. A solar receiver, comprising:
a central receiver assembly comprising an internal support structure and at least one external central tube panel, the internal support structure defining an interior volume, the at least one external central tube panel comprising a plurality of vertical tubes for conveying a heat transfer fluid, wherein the tubes are interconnected by at least one upper header and at least one lower header, and being arranged on an exterior face of the internal support structure with the at least one external central tube panel having an exposed first face and a non-exposed second face;
the central receiver assembly further comprising an upper heat shield located above the at least one external central tube panel, a lower heat shield located below the at least one external central tube panel, and a horizontal heat shield located above the at least one external central tube panel; and
at least one wing assembly extending from the central receiver assembly, each wing assembly having a wing tube panel that comprises a plurality of vertical tubes for conveying a heat transfer fluid, wherein the tubes are interconnected by at least one upper header and at least one lower header, and each wing tube panel having an first exposed face and an second exposed face opposite the first face and a heat shield having an upper face located above the wing tube panel, a lower face located below the wing tube panel, and a side face located distal from the central receiver assembly.

14. The solar receiver of claim 13, wherein an open space is present between the side face of the wing assembly heat shield and a side edge of the wing tube panel.

15. The solar receiver of claim 13, wherein the support tube of each support assembly has a larger diameter than any tube in the wing tube panel.

16. The solar receiver of claim 13, wherein the first support assembly of the first stiffener structure is fluidly connected to an inlet header of the wing tube panel or is fluidly connected to the at least one external central tube panel.

17. The solar receiver of claim 13, further comprising a second stiffener structure running from the first side edge to the second side edge across the first face and the second face of the wing tube panel at a second support elevation.

18. The solar receiver of claim 17, wherein the first support assembly of the second stiffener structure is fluidly connected to an outlet header of the wing tube panel or is fluidly connected to the at least one external central tube panel.

* * * * *